United States Patent
Liu et al.

(10) Patent No.: US 12,288,346 B2
(45) Date of Patent: Apr. 29, 2025

(54) FEATURE PYRAMID WARPING FOR VIDEO FRAME INTERPOLATION

(71) Applicant: Portland State University, Portland, OR (US)

(72) Inventors: Feng Liu, Portland, OR (US); Simon Niklaus, Portland, OR (US)

(73) Assignee: PORTLAND STATE UNIVERSITY, Portland, OR (US)

( * ) Notice: Subject to any disclaimer, the term of this patent is extended or adjusted under 35 U.S.C. 154(b) by 958 days.

(21) Appl. No.: 17/422,464

(22) PCT Filed: Jan. 14, 2020

(86) PCT No.: PCT/US2020/013545
§ 371 (c)(1),
(2) Date: Jul. 13, 2021

(87) PCT Pub. No.: WO2020/150264
PCT Pub. Date: Jul. 23, 2020

(65) Prior Publication Data
US 2022/0092795 A1 Mar. 24, 2022

Related U.S. Application Data

(60) Provisional application No. 62/792,693, filed on Jan. 15, 2019.

(51) Int. Cl.
*G06T 7/269* (2017.01)
*G06N 3/02* (2006.01)
*G06T 1/20* (2006.01)
*G06V 10/56* (2022.01)

(52) U.S. Cl.
CPC .............. *G06T 7/269* (2017.01); *G06N 3/02* (2013.01); *G06T 1/20* (2013.01); *G06V 10/56* (2022.01);
(Continued)

(58) Field of Classification Search
CPC . G06T 7/269; G06T 1/20; G06T 2207/20081; G06T 2207/20084;
(Continued)

(56) References Cited

U.S. PATENT DOCUMENTS

2002/0196372 A1* 12/2002 Ito .......................... G06T 17/00
348/700
2005/0249414 A1* 11/2005 Uehara .............. G01N 21/8851
382/181
(Continued)

FOREIGN PATENT DOCUMENTS

| KR | 10-2014-0028809 A | 3/2014 |
| KR | 10-2015-0099964 A | 9/2015 |
| KR | 10-1932009 B1 | 12/2018 |

OTHER PUBLICATIONS

Niklaus et al., "Context-aware Synthesis for Video Frame Interpolation", 2018 IEEE Conference on Computer Vision and Pattern Recognition, pp. 1701-1710 (Jun. 2018).

*Primary Examiner* — Solomon G Bezuayehu
(74) *Attorney, Agent, or Firm* — Schwabe, Williamson & Wyatt, P.C.

(57) ABSTRACT

Methods, systems, and storage media are described for motion estimation in video frame interpolation. Disclosed embodiments use feature pyramids as image representations for motion estimation and seamlessly integrates them into a deep neural network for frame interpolation. A feature pyramid is extracted for each of two input frames. These feature pyramids are wrapped together with the input frames to the target temporal position according to the inter-frame motion estimated via optical flow. A frame synthesis network is used to predict interpolation results from the pre-warped feature pyramids and input frames. The feature pyramid extractor and the frame synthesis network are jointly trained for the task of frame interpolation. An exten-
(Continued)

sive quantitative and qualitative evaluation demonstrates that the described embodiments utilizing feature pyramids enables robust, high-quality video frame interpolation. Other embodiments may be described and/or claimed.

25 Claims, 21 Drawing Sheets

(52) U.S. Cl.
CPC .............. *G06T 2207/20081* (2013.01); *G06T 2207/20084* (2013.01)

(58) Field of Classification Search
CPC ........... G06T 3/4007; G06T 3/18; G06N 3/02; G06N 3/045; G06N 7/01; G06N 3/084; G06N 3/08; G06V 10/56; H04N 7/0127; H04N 7/014; H04N 5/145
See application file for complete search history.

(56) References Cited

U.S. PATENT DOCUMENTS

| | | | |
|---|---|---|---|
| 2009/0174812 A1* | 7/2009 | Hong | H04N 19/537 348/E7.003 |
| 2009/0180033 A1* | 7/2009 | Chang | H04N 19/132 348/E9.037 |
| 2009/0285489 A1* | 11/2009 | Kanoh | G06V 30/1444 382/209 |
| 2010/0231593 A1 | 9/2010 | Zhou et al. | |
| 2015/0104116 A1* | 4/2015 | Salvador | H04N 7/0117 382/300 |
| 2015/0131922 A1* | 5/2015 | Simson | G06T 5/70 382/261 |
| 2015/0221335 A1* | 8/2015 | Licata | H04N 5/783 386/279 |
| 2017/0148222 A1* | 5/2017 | Holzer | H04N 23/698 |
| 2017/0186176 A1* | 6/2017 | Paluri | G06V 10/764 |
| 2018/0063551 A1* | 3/2018 | Adsumilli | H04N 19/137 |
| 2018/0082404 A1* | 3/2018 | Adsumilli | G06T 7/248 |
| 2018/0091768 A1* | 3/2018 | Adsumilli | H04N 7/0137 |
| 2018/0293737 A1* | 10/2018 | Sun | G06T 7/207 |
| 2018/0367734 A1* | 12/2018 | Thumpudi | H04N 23/70 |
| 2019/0138889 A1* | 5/2019 | Jiang | G06N 3/045 |
| 2019/0158843 A1* | 5/2019 | Xu | H04N 19/105 |
| 2020/0012940 A1* | 1/2020 | Liu | H04N 7/0135 |
| 2020/0084427 A1* | 3/2020 | Sun | G06N 3/045 |
| 2020/0092463 A1* | 3/2020 | Wang | G06V 10/82 |
| 2020/0104601 A1* | 4/2020 | Karoui | H04N 23/6811 |
| 2020/0394752 A1* | 12/2020 | Liu | G06T 3/4007 |
| 2021/0144364 A1* | 5/2021 | Li | H04N 19/105 |

\* cited by examiner

Table 1

| | Vimeo-90k [R49] | | | UCF101 [R30] | | |
|---|---|---|---|---|---|---|
| | PSNR ↑ | SSIM ↑ | LPIPS ↓ | PSNR ↑ | SSIM ↑ | LPIPS ↓ |
| FlowNet2 - Classic [R02] | 33.08 | 0.951 | 0.039 | 34.32 | 0.945 | 0.034 |
| FlowNet2 - FPW | 35.57 | 0.968 | 0.023 | 34.98 | 0.950 | 0.033 |
| PWC-Net - Classic [R02] | 32.24 | 0.947 | 0.042 | 33.81 | 0.942 | 0.037 |
| PWC-Net - FPW | 35.58 | 0.967 | 0.024 | 34.97 | 0.950 | 0.033 |
| PWC-Net-ft - Classic [R02] | 33.36 | 0.954 | 0.036 | 34.51 | 0.946 | 0.034 |
| PWC-Net-ft - FPW | 35.99 | 0.969 | 0.021 | 35.17 | 0.951 | 0.032 |

Figure 1T

Table 2

| | Vimeo-90k [R49] | | | UCF101 [R30] | | |
|---|---|---|---|---|---|---|
| | PSNR ↑ | SSIM ↑ | LPIPS ↓ | PSNR ↑ | SSIM ↑ | LPIPS ↓ |
| Voxel Flow [R30] | – | – | – | 34.12 | 0.942 | 0.034 |
| MDP-Flow2 [R48] | 33.47 | 0.953 | 0.035 | 34.53 | 0.946 | 0.032 |
| ToFlow [R49] | 33.73 | 0.952 | 0.027 | 34.58 | 0.947 | 0.027 |
| SepConv - $\mathcal{L}_1$ [R36] | 33.80 | 0.956 | 0.027 | 34.79 | 0.947 | 0.029 |
| SepConv - $\mathcal{L}_F$ [R36] | 33.45 | 0.951 | 0.019 | 34.69 | 0.945 | 0.024 |
| Super SloMo [R20] | – | – | – | 34.75 | 0.948 | 0.025 |
| CtxSyn - $\mathcal{L}_{Lap}$ [R34] | 34.39 | 0.961 | 0.024 | 34.62 | 0.949 | 0.031 |
| CtxSyn - $\mathcal{L}_F$ [R34] | 33.76 | 0.955 | 0.017 | 34.01 | 0.941 | 0.024 |
| FPW - $\mathcal{L}_{Lap}$ | 35.00 | 0.960 | 0.021 | 35.17 | 0.951 | 0.032 |
| FPW - $\mathcal{L}_F$ | 35.38 | 0.964 | 0.013 | 34.78 | 0.947 | 0.022 |

Figure 2T

Table 3a

| | Average | | Mequon | | Schefflera | | Urban | | Teddy | |
|---|---|---|---|---|---|---|---|---|---|---|
| | IE ↓ | NE ↓ | IE ↓ | NE ↓ | IE ↓ | NE ↓ | IE ↓ | NE ↓ | IE ↓ | NE ↓ |
| MDP-Flow2 [R48] | 5.83 | 0.87 | 2.89 | 0.59 | 3.47 | 0.62 | 3.66 | 1.24 | 5.20 | 0.94 |
| SepConv - $\mathcal{L}$ [R36] | 5.61 | 0.83 | 2.52 | 0.54 | 3.56 | 0.67 | 4.17 | 1.07 | 5.41 | 1.03 |
| Super SloMo [R20] | 5.31 | 0.78 | 2.51 | 0.59 | 3.66 | 0.72 | 2.91 | 0.74 | 5.05 | 0.88 |
| CtxSyn - $\mathcal{L}_{L_a}$ [R34] | 5.28 | 0.82 | 2.24 | 0.50 | 2.96 | 0.55 | 4.32 | 1.42 | 4.21 | 0.87 |
| FPW - $\mathcal{L}_{Lap}$ | 4.26 | 0.65 | 2.11 | 0.47 | 2.94 | 0.55 | 2.18 | 0.51 | 3.97 | 0.82 |

Table 3b

| | Backyard | | Basketball | | Dumptruck | | Evergreen | |
|---|---|---|---|---|---|---|---|---|
| | IE ↓ | NE ↓ | IE ↓ | NE ↓ | IE ↓ | NE ↓ | IE ↓ | NE ↓ |
| MDP-Flow2 [R48] | 10.20 | 0.98 | 6.13 | 1.00 | 7.36 | 0.70 | 7.75 | 0.78 |
| SepConv - $\mathcal{L}_1$ [R36] | 10.20 | 0.99 | 5.47 | 0.96 | 6.88 | 0.68 | 6.63 | 0.70 |
| Super SloMo [R20] | 9.56 | 0.94 | 5.37 | 0.96 | 6.69 | 0.60 | 6.73 | 0.69 |
| CtxSyn - $\mathcal{L}_{L_a}$ [R34] | 9.59 | 0.95 | 5.22 | 0.94 | 7.02 | 0.68 | 6.66 | 0.67 |
| FPW - $\mathcal{L}_{Lap}$ | 7.05 | 0.82 | 4.53 | 0.85 | 5.53 | 0.59 | 5.78 | 0.62 |

Figure 3T

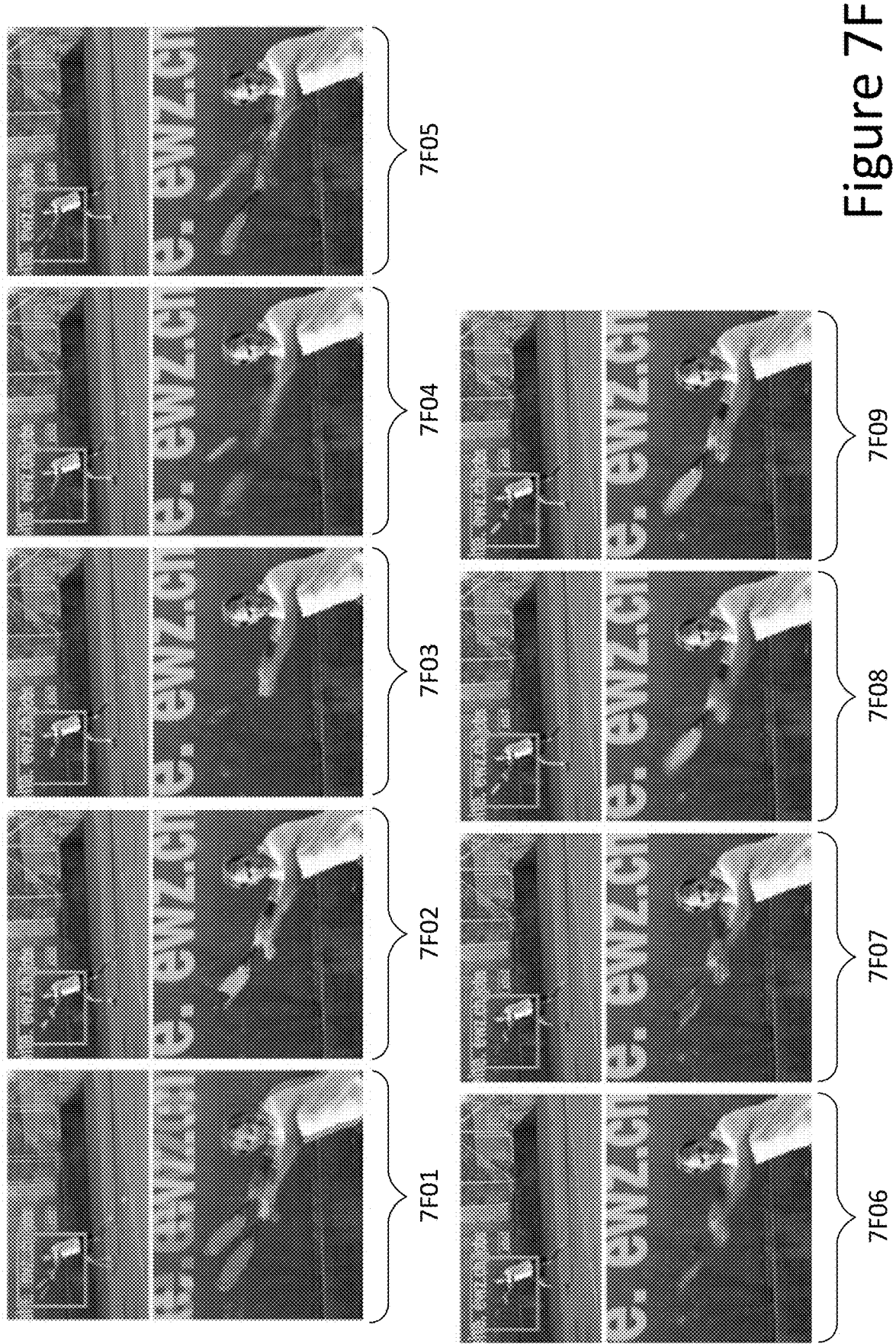

FEATURE PYRAMID WARPING FOR VIDEO FRAME INTERPOLATION

RELATED APPLICATIONS

The present application is a national phase entry under 35 U.S.C. § 371 of Int'l App. No. PCT/US2020/013545 filed Jan. 14, 2020, which claims priority to U.S. Provisional App. No. 62/792,693 filed on Jan. 15, 2019, the contents of each of which is/are hereby fully incorporated by reference in their entireties.

FIELD

The present disclosure generally relates to the fields of signal processing and computer vision, and in particular, to video frame interpolation via feature pyramid warping

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Video frame interpolation is a classic problem in computer vision with many practical applications. For example, video frame interpolation can be used to convert the frame rate of a video and match it to the refresh rate of the monitor to improve the video viewing experience, as recently demonstrated by analyzing human electroencephalographic power spectra [R26], [R27]. Video frame interpolation can also support otherwise labor-intensive video editing tasks, such as color propagation [R31]. Instead of modifying each frame, one could instead modify only a few key frames and use interpolation to propagate these modifications to the remaining frames. Frame interpolation can also support inter-frame compression for videos [R47]. While these applications employ video frame interpolation in the temporal domain, it can be applied to synthesize views in space as well by interpolating between given viewpoints [R09]. High-quality dense correspondences between input frames, typically in the form of optical flow, are critical for interpolation.

However, optical flow estimation itself is a challenging problem and faces difficulties such as occlusion, large motion, and lack of texture [R06], [R19]. To address these challenges, many existing techniques extract various features to establish correspondences [R01], [R04], [R05], [R15], [R46]. Recently, [R16] and [R44] et al. proposed to train a feature pyramid extractor for optical flow estimation and achieved new state-of-the-art results. However, to use optical flow for video enhancement, [R49] show that it is important to fine-tune optical flow to the target task.

Optical flow estimation is an integral part of video frame interpolation. Surveys of non-deep learning optical flow methods can be found in [R02] and [R43]. [R07] shows that a convolutional neural network can compete with the traditional variational approach for optical flow estimation. [R17] stack multiple such networks to handle small and large displacements appropriately. [R39] utilize spatial pyramids to combine classic optical flow principles with deep learning. Recently, [R16] and [R44] propose more advanced spatial pyramid techniques that further improve the optical flow prediction.

Off-the-shelf optical flow can directly be used to perform video frame interpolation. [R02] proposes to warp input frames while filling in any holes using an outside-in strategy and taking occlusion masks into consideration, in order to employ frame interpolation as an auxiliary error metric for optical flow estimation. [R13] reason about occlusions according to forward and backward flow, before synthesizing the intermediate frame form candidate flows selected using a Markov random field method. [R20] jointly predicts optical flow in both directions, before linearly fusing these predictions to synthesize the interpolation result. [R34] likewise warps the input frames according to bidirectional flow but fuse them using a synthesis network that leverages contextual information. Using optical flow in this way enables frame interpolation at an arbitrary temporal location.

Besides directly using an off-the-shelf method to output optical flow results, some methods customize optical flow estimation for the task of video frame interpolation. [R38] modify the optical flow formula and make it symmetric and thus avoid estimating optical flow in both directions. [R30] estimate voxel flow using a convolutional neural network and incorporate selection masks to perform view synthesis. [R49] propose task-oriented flow, which, while not modifying the optical flow formulation, optimizes optical flow for specific video processing tasks such as frame interpolation.

Instead of using optical flow, [R32], [R33] represent motion as a phase-shift in the frequency domain. This approach performs well in challenging scenarios that contain motion blur and brightness changes but is limited in the motion range that it can handle due to phase ambiguities. [R35], [R36] combine motion estimation and view synthesis into a single step via adaptive convolution. While this is a robust formulation for small displacements, it is unable to handle large displacements due to its limited kernel size.

Video frame interpolation is related to novel view interpolation, where a new image is rendered from a viewpoint between two given views. Like with frame interpolation, deep learning has also been applied to view interpolation. For instance, [R09] integrates a plane sweep volume into a neural network to interpolate between views separated by a wide baseline. In [R51], a neural network is trained to estimate appearance flow to warp and blend pixels to synthesize novel views. In [R22], neural networks are used to separately model disparity estimation and blending, and jointly train them to synthesize new views from a sparse set of input views.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1T depicts a table in which baseline comparisons on two different optical flow methods, FlowNet2 [R17] and PWC-Net [R44] are shown. FIG. 2T depicts a table in which a quantitative comparison of various conventional video frame interpolation methods and the FPW embodiments on several public datasets is shown. FIG. 3T depicts a table in which a quantitative ranking on the relevant interpolation category of the Middlebury benchmark for optical flow [R02] is shown. FIGS. 7D, 7E, 7F, and 7G show additional interpolation results for four difficult examples, comparing the feature pyramid warping embodiments with several conventional video interpolation techniques.

DETAILED DESCRIPTION

Figure 1:
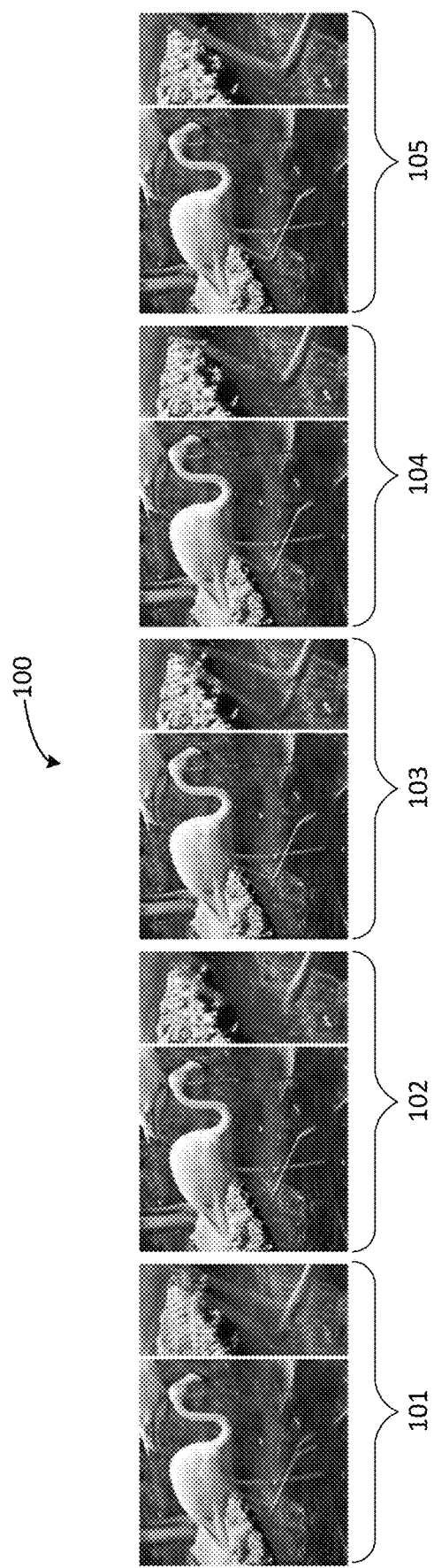
FIG. 1 depicts example video frames for video frame interpolation.

Embodiments described herein are related to providing motion estimation for video frame interpolation, and in particular, machine learning for frame interpolation using feature pyramids that are optimized for video frame interpolation. One goal of frame interpolation is to accomplish motion estimation and motion compensation. Motion estimation involves estimating the state between two images, and/or determining motion vectors that describe the transformation from one 2D image to another (usually from adjacent frames in a sequence of video frames). The motion vectors may relate to the whole image or portions of an image (e.g., rectangular or arbitrary shaped blocks of pixels, or per pixel). The motion vectors may be represented by a translational model or some other type of model. Motion compensation involves predicting a frame in a video, given the previous frame and/or one or more future frames by accounting for motion of objects in the video and/or motion of the camera. Embodiments build upon the power of feature pyramids as image representations for motion estimation and seamlessly integrates them into a deep neural network for frame interpolation. The present disclosure provides video frame interpolation embodiments that leverage feature pyramids as a powerful image representation and optimizes them for the task of frame interpolation.

In various embodiments, a feature pyramid is extracted for each of the two input frames. These feature pyramids are warped together with the input frames to the target temporal position according to the inter-frame motion estimated via optical flow. An optical flow is a pattern of apparent motion of objects, surfaces, and edges in a visual scene caused by the relative motion between an observer and a scene, and/or a distribution of apparent velocities of movement of brightness patterns in an image or video. In embodiments, the optical flow component is fine-tuned for video frame interpolation tasks. A frame synthesis network is then used to predict the interpolation result from these pre-warped feature pyramids and input frames. The feature pyramid extractor and the frame synthesis network are jointly trained, which optimizes them for the task of frame interpolation. Other embodiments are described and/or claimed.

In various embodiments, a deep neural network is utilized as a feature pyramid extractor and a feature pyramid is generated for each of two input frames. The feature pyramids are then pre-warped to the target temporal position of the intermediate frame according to the motion estimated by an off-the-shelf optical flow mechanism, which is fine-tuned for video frame interpolation. A frame synthesis network is employed to interpolate the intermediate frame guided by these features. The feature extractor and the frame synthesis network are jointly trained to optimize them for video frame interpolation. Other embodiments are described and/or claimed.

The embodiments herein can interpolate video frames in challenging scenarios. The power of the embodiments discussed herein comes from the combination of using a feature pyramid as a powerful image representation and pre-warping of feature pyramids that allows them to focus on fine details needed for high-quality image synthesis. As shown by experimentation, feature pyramids for frame interpolation exhibit patterns that are different from those for motion estimation. Moreover, jointly training of the feature pyramid extractor network and the frame synthesis network further optimizes both networks for video frame interpolation. Finally, the performance of the present embodiments is not closely tied to a particular optical flow method. The present disclosure also provides an extensive quantitative and qualitative evaluation, which demonstrates that utilizing feature pyramids according to the various embodiments discussed herein enables robust, high-quality video frame interpolation when compared to conventional approaches. While the embodiments are described herein with respect to frame interpolation, the embodiments herein can also be used for view interpolation and multi-frame interpolation.

Referring now to the figures, FIG. 1 depicts challenging examples 100 for video frame interpolation using various frame interpolation methods, including one example 105 using the Feature Pyramid Warping (FPW) techniques of the embodiments discussed herein ("FPW-$L_F$"). The flamingo leg images depicted by FIG. 1 poses a significant challenge due to its delicate shape and large motion. FIG. 1 shows the flamingo legs according to example 101 using overlayed input frames, example 102 using task-oriented flow (ToFlow) [R49], example 103 using separable convolution (SepConv)-$L_F$ [R36], example 104 using context-aware synthesis (CtxSyn)-$L_F$ [R34], and an example 105 using the embodiments discussed herein, referred to as FPW-$L_F$. As can be seen from FIG. 1, it is difficult to estimate and/or compensate for the movement of the flamingo leg, and using the existing frame interpolation methods either have artifacts or duplications. Compared to the frame interpolation existing methods, FPW leverages and optimizes feature pyramids for frame interpolation and achieves a high-quality frame interpolation result for this challenging example.

As shown in FIG. 1, FPW can interpolate video frames in challenging scenarios. The power of FPW comes from the combination of using a feature pyramid as a powerful image representation and pre-warping of feature pyramids that allows them to focus on fine details needed for high-quality image synthesis. As discussed in more detail infra, feature pyramids for frame interpolation exhibit patterns that are different from those for motion estimation. Moreover, jointly training of the feature pyramid extractor network and the frame synthesis network further optimizes both networks for video frame interpolation. Finally, the performance of the embodiments herein is not closely tied to a particular optical flow implementation. FPW generates high-quality interpolation results whether an Optical Flow with Convolutional Networks (FlowNet) [R07], FlowNet 2.0 (FlowNet2) [R17], or Pyramid, Warping, and Cost volume neural network (PWC-Net) [R44] is used. In particular, the quantitative and qualitative evaluation discussed infra demonstrates that FPW, which utilizes feature pyramids, enables robust, high-quality video frame interpolation as compared to conventional techniques.

1. VIDEO FRAME INTERPOLATION EMBODIMENTS

Given two input frames $I_0$ and $I_1$, video frame interpolation seeks to generate an intermediate frame $I_t$ where $t \in (0, 1)$ defines the desired temporal position in-between the two input frames. In embodiments, feature pyramids are integrated with a frame synthesis neural network for high-quality video frame interpolation.

1.1. Feature Pyramid Warping

Figure 2:
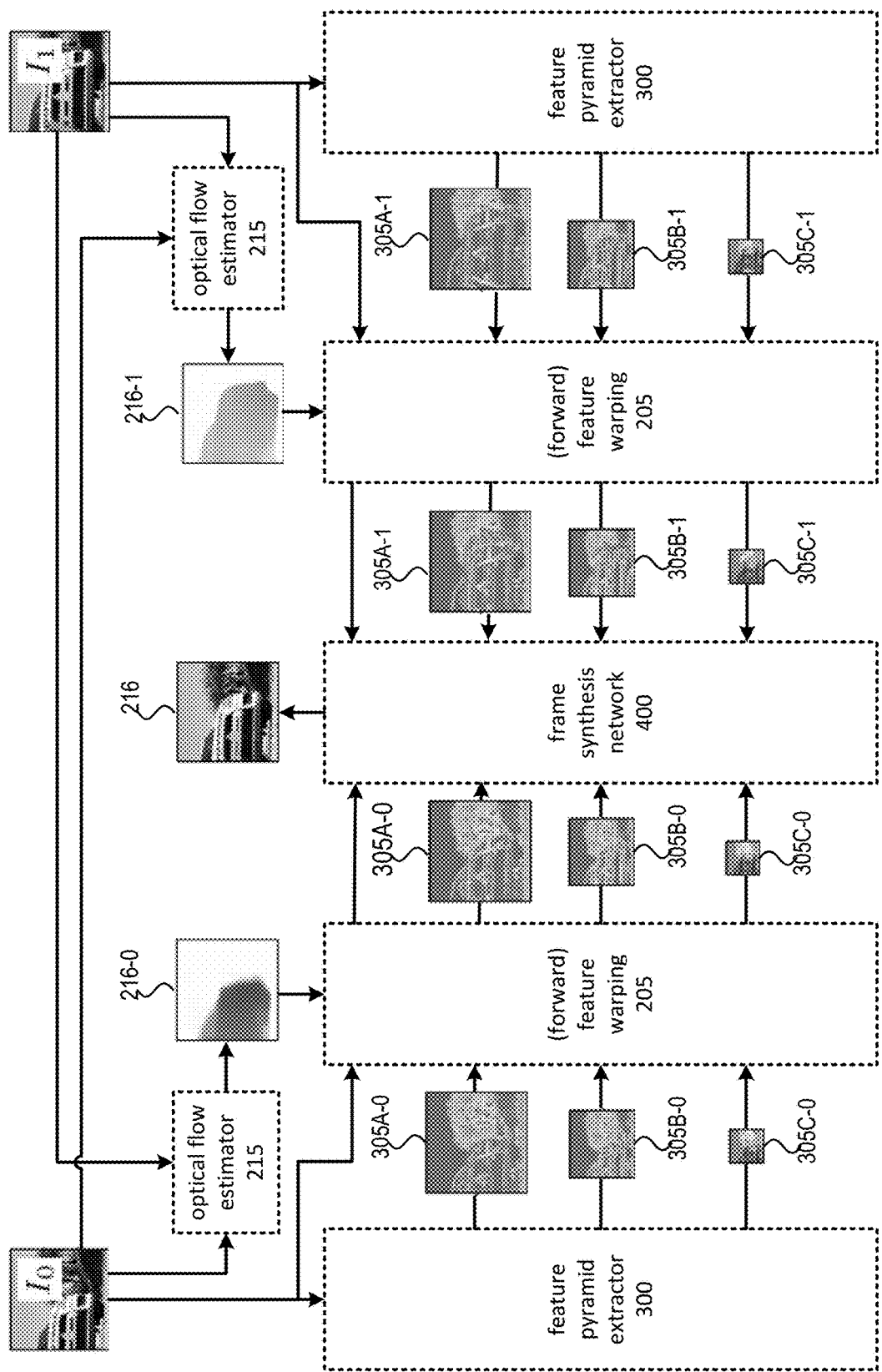
FIG. 2 depicts an example architecture of a frame interpolation neural network according to various embodiments.

FIG. 2 depicts an example frame interpolation neural network (FINN) architecture 200 according to various embodiments. The FINN architecture 200 (or simply "FINN 200") is a deep neural network that integrates feature pyramids as an image representation for high-quality video frame interpolation. As shown by FIG. 2, the FINN architecture 200 includes feature pyramid extractors (FPEs) 300, forward warping engines (FWEs) 205, a frame synthesis neural network (FSN) 400, and optical flow estimators (OFEs) 215. Although two OFEs 215, two FPEs 300, two FWEs 205, and one FSN 400 are shown by FIG. 2, in other embodiments, the FINN 200 may include only one OFE 215, one FPE 300, one FEW 205 and one FSN 400, or may include many more OFEs 215, FPEs 300, FWEs 215, and FSNs 400 than shown.

The OFEs 215 estimate inter-frame motion in both directions of two input frames $I_0$ and $I_1$, and/or estimate the bidirectional optical flow between the two input frames $I_0$ and $I_1$. In embodiments, the OFEs 215 estimate a forward optical flow 216-0 (e.g., from input frame $I_0$ to input frame $I_1$) and a backward optical flow 216-1 (e.g., from input frame $I_1$ to input frame $I_0$). An optical flow indicates how pixels move from one frame to another frame. For example, an optical flow may indicate how (e.g., in what direction(s)) certain pixels moved from one frame to a next frame. In the example of FIG. 2, a car is depicted moving forward from frame $I_0$ to frame $I_1$, and the car moves backward from frame $I_1$ to frame $I_0$, and forward flow 216-0 estimates the flow of the car from frame $I_0$ to frame $I_1$, and backward flow 216-1 estimates the flow of the car from frame $I_0$ to frame $I_1$.

The OFEs 215 are software engines, modules, objects, or other like logical units that perform motion estimation for frame interpolation. In other implementations, the OFEs 215 may be hardware elements configured with an appropriate bit stream, logic blocks, or the like to perform motion estimation for frame interpolation. In various embodiments, the motion estimation is performed explicitly through optical flow; however, in other embodiments the motion estimation may be done implicitly through adaptive convolution. Optical flow estimation uses precise per-pixel localization and finds correspondences between two input images, which involves not only learning image feature representations, but also learning to match them at different locations in the two images. In other words, an optical flow describes how pixels move between images, which may include a data structure that indicates pixel correspondences between two images (or video frames). For example, FlowNet uses a convolutional neural network (CNN) architecture to directly learn the concept of optical flow from data. In embodiments, FPW is based on explicit motion estimation using optical flows. In these embodiments, the optical flow formulation is not altered, which allows the FPW to leverage the ongoing progress in optical flow estimation. In some embodiments, FPW may utilize works equally well for two recent state-of-the-art optical flow methods, FlowNet2 [R17] and PWC-Net [R44].

The FPE(s) 300 extract features from the input images (e.g., input frames $I_0$ and $I_1$). In particular, the FPE(s) 300 extract feature pyramid representations of the two input frames $I_0$ and $I_1$ and the FWEs 205 pre-warp the feature pyramids together with the input frames $I_0$ and $I_1$ to the target temporal position t according to the estimated optical flow(s) output by the OFEs 215. The FPEs 300 perform, for example, principal component analysis on the feature space to generate the visualization of the feature pyramids. A feature pyramid includes, inter alia, various representations of an input frame $I_0$ or $I_1$ at different resolutions, where each level in the feature pyramid includes the input frames at one of the different resolutions. In the example of FIG. 2, a feature pyramid includes three levels 305A-0, 305B-0, and 305C-0 of input frame $I_0$ at three different resolutions, and another feature pyramid includes three levels 305A-1, 305B-1, and 305C-1 of input frame $I_1$ at the three different resolutions.

Each level of each feature pyramid includes a set of features. In various embodiments, at least some features in each set of features are based on a color space (or color model) of the input frames. The color space/model may be, for example RGB (Red, Green, Blue), CMYK (cyan, magenta, yellow, key), HSL (hue, saturation, lightness) and/or HSV (hue, saturation, value), YUV (luma, blue chroma/projection, red chroma/projection), LAB or CIELAB, and/or the like. The color space in which the FINN 200 operates is flexible as long as the FINN 200 is trained on the specific color space. Additionally or alternatively, pixel luminance values may be feature(s) among the feature sets. In various embodiments, the features to be extracted are learned by the FPEs 300. In some embodiments, the FPEs 300 also learn the number of features at each pyramid level to extract from the input images using a suitable backpropagation technique. The FPEs 300 learn the features to be extracted and then warps those features at multiple resolutions (e.g., each resolution of each pyramid level). In some embodiments, the particular features to be extracted is/are dictated by the FSN 400, such that it can do its job of interpolating and maintaining good frame as is possible. The architecture of the FPEs 300 is shown by FIG. 3.

Figure 3:
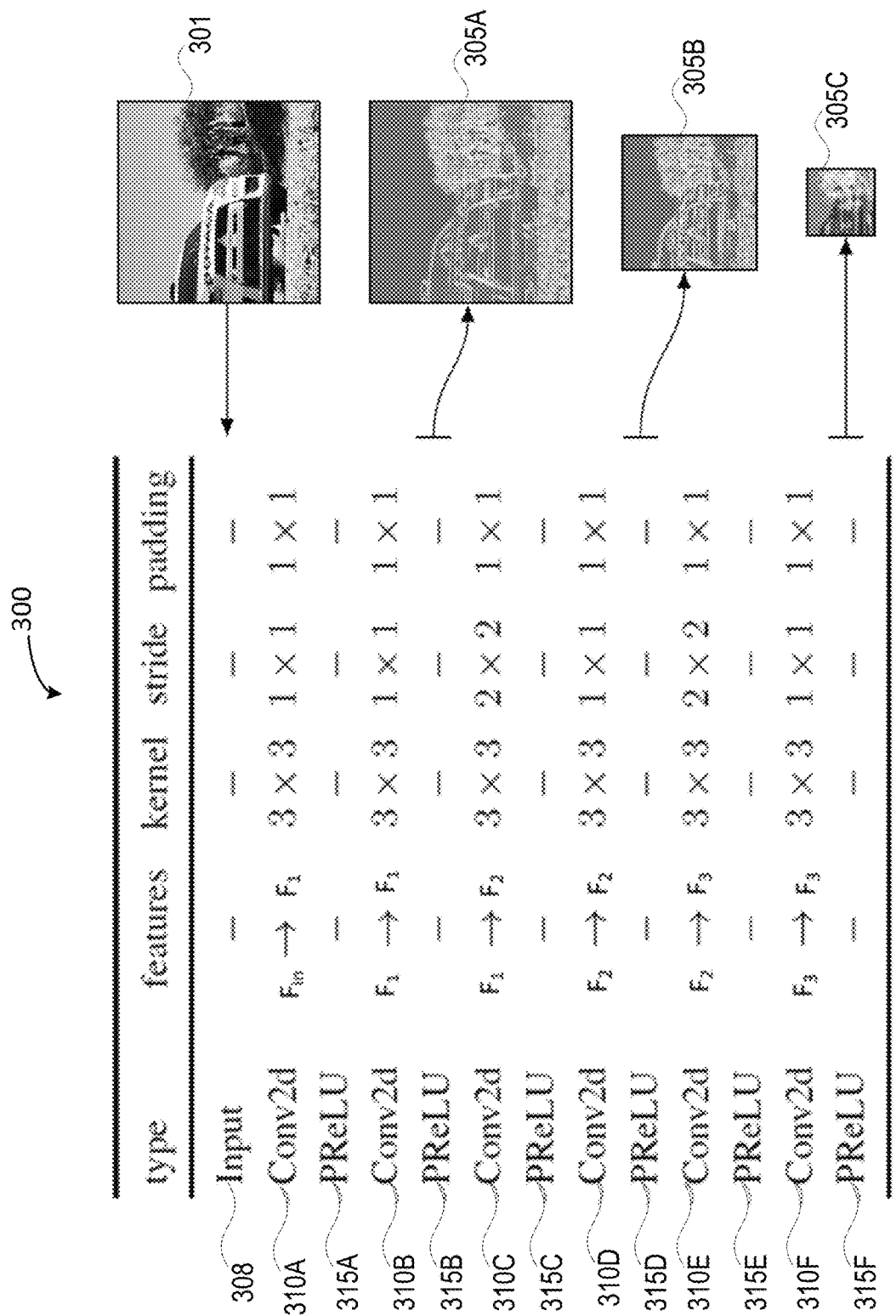
FIG. 3 depicts an example architecture of a feature pyramid extractor according to various embodiments.

Referring now to FIG. 3, given an input image 301, the FPE 300 returns a feature pyramid 305 with three levels 305A, 305B, and 305C. In various embodiments, the FPE 300 may be a multi-layer neural network (NN), such as a feedforward NN (FNN), a convolutional NN (CNN), and/or some other NN. The layers in the NN include an input layer that receives data of input variables (e.g., input features), one or more hidden layers that process the inputs, and an output layer that outputs the determinations or assessments of the NN. In one example implementation, the input variables are set as one or more vectors containing the relevant variable data, and the output determination or assessment also comprises one or more vectors. Multiple connection patterns between different layer in the NN may be used. Additionally, each layer may include one or more neurons (or "nodes"), each of which receives one or more inputs and produces an output (or "activation"). The function that is applied to the input values is determined by a vector of weights and a bias (learning in the NN progresses by making iterative adjustments to these biases and weights). The vector of weights and the bias are called "filters" and represent particular features. The output of each node is passed through an activation function, which determines whether the out should be activated or not based on whether the input is relevant for the model's prediction. The term "activation function" refers to a function of a node that defines the output of that node given a set of inputs, wherein the output is then used as input for a next node and so on until a desired solution to the original problem is found.

In various embodiments, the one or more hidden layers of the FPE 300 include a series of convolutional layers that convolve with a multiplication or other dot product, and the activation function(s) may be Rectified Linear Units ("ReLUs" or "rectifiers") or Parametric ReLUs ("PReLUs"). ReLUs are activation functions that compute the function $f(x)=\max(0, x)$, where the activation of a ReLU is zero when x<0 and linear with slope 1 when x>0 (e.g., the activation is thresholded at zero). PReLUs, are activation functions that compute the function $$f(y_i) = \begin{cases} y_i, & \text{if } y_i > 0 \\ a_i y_i, & \text{if } y_i \leq 0 \end{cases}$$

where $y_i$ is the input of the nonlinear activation function $f$ on the i-th channel, and $\alpha_i$ is a coefficient (a "leak parameter") controlling the negative slope such that when $\alpha_i=0$, the PReLU becomes an ReLU and when a; is a relatively small number (e.g., $\alpha_i=0.01$), the PRELU becomes a leaky ReLU. In this way, PReLUs make the coefficient of leakage into a parameter that is learned along with other neural network parameters. In other words, PRELUs learn a leak parameter a in order to find a proper positive slope for negative inputs, which prevents negative neurons from dying (i.e., neurons that are always equal to zero) due to null derivatives that block back-propagated error signals.

In the example of FIG. 3, the FPE 300 is represented by a table, where operation of the FPE starts at the top of the table until the bottom of the table is reached. Each row in the table represents a layer in the NN. The FPE 300 includes input layer 308 that receives an input image (frame) 301 (e.g., input frames $I_0$ and/or $I_1$) at a first resolution, and each hidden layer includes a 2D convolutional layer (Conv2d) 310 and a corresponding activation function (PreLU) 315 (which may be referred to as "convolutional layers 310" or the like). In this example, the FPE 300 uses strided convolutions 310 (including strided convolutions (Conv2d) 310A-310F) to perform downsampling and utilizes PReLUs 315 (including PRELUs 315A-315F) as activation functions initialized with a=0.25 [R12]. Other activation functions may be used in other embodiments.

From the input image 301 received at input layer 308, the first convolutional layer 310A selects (extracts) a first set of features ($F_1$) from a set of input features ($F_{in}$), which is shown by the "features" column in the table. In the context of ML, a feature is an individual measureable property or characteristic of a phenomenon being observed. Features are usually represented using numbers, strings, variables, graphs, or the like, and a set of features may be referred to as a "feature vector." Each convolutional layer 310 may take two inputs, for example, an image matrix of the input image and a filter or kernel (shown in the "kernel" column), and may produce a feature map as an output that summarizes the presence of detected features in the input. The features extracted from each layer 310 are fed into the next layer 310 to produce successive sets of features (e.g., including feature sets $F_1$, $F_2$, and $F_3$ in the example of FIG. 3).

In various embodiments, the set of input features ($F_{in}$) is based on the color space of the input image 301 (e.g., Red, Green, and Blue for an RGB color space, where $F_{in}$ includes three features). Additionally or alternatively, the set of input features ($F_{in}$) may include luminance values for one or more pixels in the image 301. Additionally or alternatively, the set of input features ($F_{in}$) may include, for each pixel, a descriptor describing pixel values and/or other information in the area of each pixel. The set of input features ($F_{in}$) may also be learned through backpropagation or the like.

In some embodiments, 96 features may be extracted at each layer 310 (e.g., feature sets $F_1$, $F_2$, and $F_3$ may each have 96 features). In other embodiments, 32 features may be extracted for the highest resolution (e.g., $F_1=32$), 64 features may be extracted for the medium resolution (e.g., $F_2=64$), and 96 features may be extracted for the lowest resolution (e.g., $F_3=96$). In embodiments, the FPE 300 may be configured to extract any number of features at each layer. It should be noted that there may be a tradeoff in terms of quality versus time and resource consumption in that, increasing the number of extracted features may improve the frame interpolation quality, but it may also increase the amount of time to calculate the interpolation results and increase resource consumption. Likewise, decreasing the number of extracted features may improve system performance (e.g., in terms of processing time and resource consumption), but it may also decrease the quality of the interpolation results.

Each layer produces a lower resolution representation of the input image 301. For example, image 305A has a lower resolution than the input image 301, image 305B has a lower resolution than image 305A, and image 305C has a lower resolution than image 305B. The resolution gets reduced using the strided convolutions 310. Stride is the number of pixels shifts over the input matrix. When the stride is 1 then the filters are moved one pixel at a time, and when the stride is 2 then the filters are moved two pixels at a time. As shown by the stride column in FIG. 3, two layers have strides of 2×2 and the other layers have strides of 1×1. In embodiments, when the stride is 2×2 for the convolution, then the output size is half of the input size. In some embodiments, a stride of 1×1 may be used for dimensionality reduction. In the example of FIG. 3, the resolution at each level is halved. Padding (as shown by the padding column in FIG. 3) may also be used to control of the output volume spatial size. Although FIG. 3 shows three resolution levels with six convolutional layers 310 and six activation functions 315, any number of levels and/or layers may be used in other embodiments. However, it should be noted that adding or reducing the number of layers or levels may have a similar performance/quality tradeoff as discussed previously.

Referring back to FIG. 2, the FWEs 205 warps (pre-warps) the feature pyramids (e.g., feature pyramid 305 of FIG. 3, including the feature pyramid levels 305A, 305B, and 305C) together with the input frames $I_0$ and $I_1$ to the target temporal position t according to the estimated optical flow output by the OFEs 215. As used herein, the term "warp" or "warping" refers to moving pixels in one image (or video frame) to a location prescribed by the optical flow. In the example of FIG. 2, the FWEs 205 warp input frame $I_0$ towards input frame $I_1$ (e.g., moving the car forward in time) using the forward optical flow from an OFE 215, and warp input frame $I_1$ towards input frame $I_0$ (e.g., moving the car backward in time) using the backward optical flow from an OFE 215. Warping the input frames $I_0$ and $I_1$ in this manner allows the pixels in the input frames $I_0$ and $I_1$ to be shifted to a desired temporal position (1) between input frames $I_0$ and $I_1$.

Additionally, the extracted feature pyramids 305 are warped together with the input frames $I_0$ and $I_1$ to the target temporal position $t \in (0, 1)$ according to the estimated optical flow(s). In embodiments, the FWEs 205 warp (pre-warp) the feature pyramid 305 of the first frame $I_0$ according to the forward optical flow scaled by t and the feature pyramid of the second frame $I_1$ according to the backward optical flow scaled by 1-t. To warp the individual levels of the pyramids, the FWEs 205 resize and rescale the full-resolution optical flow. In some embodiments, the FWEs 205 perform forward warping, such as the scheme discussed by [R34], instead of using backwards warping as introduced by spatial transformer networks [R18]. This allows the FWEs 205 to effectively interpolate frames at an arbitrary temporal position t as demonstrated in the evaluation discussed infra. However, forward warping is subject to ambiguities where two source pixels are mapped to the same target, which is resolved through photo-consistency checking [R02]. Furthermore, in embodiments, the FWEs 205 utilize the photo consistency as an auxiliary measurement as the quality of the optical flow estimation, following the design principles of FlowNet2 [R17]. The subsequent FSN 400, which is described infra, is thus able to incorporate this quality measure when combining the information from the warped (pre-warped) feature pyramids. The pre-warped feature pyramids 305 and input frames $I_0$ and $I_1$ are fed to the FSN 400 to generate a final interpolation result. The FSN 400 is configured to take the pre-warped input frames and feature pyramids as inputs, and produce the interpolation result. An example architecture of the FSN 400 is shown by FIG. 4.

Figure 4:
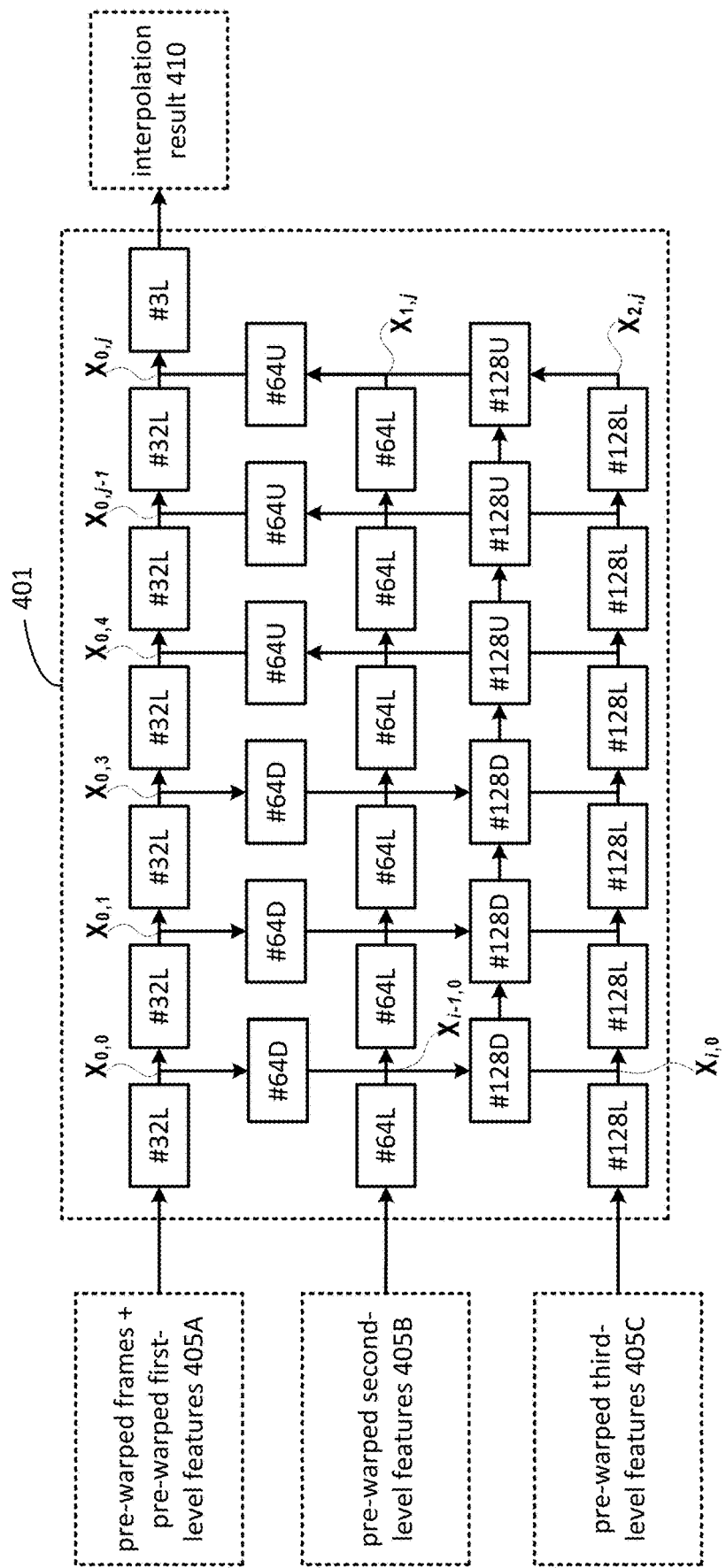
FIG. 4 depicts an example architecture of a feature synthesis network according to various embodiments.

FIG. 4 depicts an example architecture of the FSN 400 according to various embodiments. The FSN 400 produces the frame interpolation result 410, guided by the warped feature pyramids of the two input frames $I_0$ and $I_1$. In this example, the FSN 400 employs a grid network, such as a residual conv-deconv grid network (GridNet) [R10] architecture for this purpose, with the modifications discussed by [R34] to prevent checkerboard artifacts [R37]. An example of such a GridNet is shown and described by co-pending U.S. Provisional Application No. 62,635,675, filed Feb. 27, 2018, titled "CONTEXT-AWARE SYNTHESIS FOR VIDEO FRAME INTERPOLATION." Other types of grid may be used in other embodiments, such as U-net or the like. In general, the GridNet architecture allows information within the neural network to take multiple paths, which enables it to learn how to best combine feature representations at multiple scales. In particular, the FSN 400 concatenates the two warped feature pyramids channel-wise level by level, and feeds them to a GridNet with one or more rows and one or more columns. As such, this architecture is able to combine the multi-scale information from the warped feature pyramids in order to synthesize the interpolation result 410.

In the example of FIG. 4, the FSN 400 is a GridNet that is organized into a two-dimensional grid with three rows and six columns where information/data is processed in computation layers, which connect feature maps $X_{i,j}$. In general, a feature map is a function which maps a data vector to feature space. Each layer applies a filter (or "kernel") to input information/data, and outputs a corresponding feature map $X_{i,j}$. Element-wise matrix multiplication is performed at each layer and the result is summed, and the sum is placed into a feature maps $X_{i,j}$. Each feature map $X_{i,j}$ in the grid is indexed by line i and column j, where i is the total number of rows or lines, and j is the total number of columns. For clarity, not all feature maps $X_{i,j}$ are labelled in FIG. 4. Horizontal connections (i.e., the rows of the GridNet) are referred to as "streams." Streams are fully convolutional and keep feature map sizes constant. Streams are also residual, which means that they predict differences to their input. Vertical computing layers are also convolutional, but they change the size of the feature maps. According to the position in the grid, spatial sizes are reduced by subsampling or increased by upsampling, respectively.

The rows of the GridNet include residual layers that perform lateral sampling (denoted with "L" in FIG. 4). Each residual layer does not change the input map resolution or the number of feature maps. In other words, the layers in each row form a stream in which the feature resolution is kept constant. Each of the three streams processes information at a different scale. The columns connect the streams to exchange information by using down-sampling and up-sampling layers. The first three columns of the GridNet (e.g., where j=0, 1, or 2) include convolutional layers that perform downsampling (denoted with "D" in FIG. 4), which decrease the resolution and doubles the number of feature maps. The last three columns of the GridNet (e.g., where j=3, 4, or 5) include deconvolutional layers that perform upsampling (denoted with "U" in FIG. 4), which increase the resolution and divide by two the number of feature maps. The pound or hash ("#") symbol in each block denotes the number of output-channels of that block.

In the example of FIG. 4, the pre-warped frames and pre-warped first-level features 405A are fed into a 32 output-channel residual block in the first row, the pre-warped second-level features 405B are fed into a 64 output-channel residual block in the second row, and the pre-warped third-level features 405C are fed into a 128 output-channel residual block in the third row. The pre-warped features are output from the 3 output-channel residual block in the first row. Between these points, the pre-warped frames can flow in several paths. In some embodiments, the FSN 400 may incorporate parametric rectified linear units (PReLUs) for improved training and use bilinear upsampling to avoid checkerboard artifacts. For example, each of the rows and columns in the FSN 400 may include one or more convolution layers with one or more PRELU layers disposed therebetween.

In various embodiments, the FINN 200 may be a fully differentiable pipeline. While in the example of FIG. 2 the OFEs 215 are pre-trained and the FPEs 300 and FSN 400 are trained, the FINN 200 pipeline is not limited to this configuration. Instead, thanks to being fully differentiable, the OFEs 215 can be fine-tuned for the task of video frame interpolation. This is supported by the findings in [R49] who argue that a generic motion estimator might be sub-optimal for specific tasks.

According to various embodiments, since the FINN 200 is fully differentiable, gradients may be calculated for the feature warping operations (e.g., by the FWEs 205) and/or the frame interpolation operations (e.g., by the FSN 400), and used for backpropagation. Backpropagation is a deep learning technique that allows an NN to determine and/or change the parameters of the ML model. This allows the FPEs 300 (see e.g., FIG. 3) to be trained on the number and type of features to be extracted from input images 301. This may also allow the FSN 400 to be trained on which features are useful for synthesizing feature pyramids to produce output images.

The subsystems 205, 215, 300, and 400 of the FINN 200 may be implemented as software components (e.g., software engines, software agents, artificial intelligence (AI) agents, modules, objects, or other like logical units), as individual hardware elements, or a combination thereof. In an example software-based implementation, the subsystems of the FINN 200 may be developed using a suitable programming language, development tools/environments, etc., which are executed by one or more processors of one or more computing systems (see e.g., processor circuitry 902 of FIG. 9). In this example, program code of the subsystems 205, 210, 215, and 300 of the FINN 200 may be executed by a single processor or by individual processing devices. In an example hardware-based implementation, each subsystem 205, 210, 215, and 300 of the FINN 200 is implemented in a respective AI accelerating co-processor(s), AI GPUs, tensor processing units (TPUs), or hardware accelerators (e.g., FPGAs, ASICs, DSPs, SoCs, etc.) that are configured with appropriate logic blocks, bit stream(s), etc. to perform their respective functions.

1.2. Machine Learning Model Training

Machine learning (ML) involves using algorithms to progressively improve their performance on a specific task or tasks. Generally, an ML algorithm is a computer program that learns from an experience (e.g., "training data" or "training datasets") with respect to some task and/or some performance measure. An ML model is any object or data structure created after an ML algorithm is trained with one or more training datasets. After training, an ML model may be used to make predictions on new datasets. Although the term "ML algorithm" refers to different concepts than the term "ML model," these terms may be used interchangeably for the purposes of the present disclosure.

In various embodiments, the FPE 300 and the FSN 400 are trained jointly using Adam [R24] with $\alpha=0.001$, $\beta_1=0.9$, and $\beta_2=0.999$ for 50 epochs. When subsequently fine-tuning the OFEs 215, the training is continued with $\alpha=0.0001$ for 50 more epochs. Eight (8) samples are used per batch for each of these two training processes.

Two loss functions are considered for training purposes, including a color loss function and a perceptual loss function. Accordingly, two different versions of the model are trained. The model trained on color loss performs well in standard benchmarks, while the model trained on perceptual loss retains more details in difficult cases. For the color loss, a loss based on the difference between Laplacian pyramid representations may be utilized, which is expressed by equation 1 [R03], [R34].

$$\mathcal{L}_{Lap} = \sum_{i=1}^{5} 2^{i-1} \| \mathcal{L}^i(\hat{I}_t) - \mathcal{L}^i(I_t^{gt}) \|_1 \quad \text{[Equation 1]}$$

In equation 1, $L_{Lap}$ represents the color loss, and $L_i$ represents the i-th level of the Laplacian pyramid of I. Regarding the perceptual loss, a loss based on the difference between deep image features is employed, which is expressed by equation 2 [R20], [R21], [R28], [R29], [R36], [R34], [R40].

$$\mathcal{L}_F = \| \phi(\hat{I}_t) - \phi(I_t^{gt}) \|_2^2 \quad \text{[Equation 2]}$$

In equation 2, $L_F$ represents the perceptual loss, and $\phi$ represents feature activations from a generic image classification network. I may be the same as in equation 1. In some embodiments, the activations of the relu4_4 layer from VGG-19 [R41] may be used.

Any suitable training dataset may be used to train the network (e.g., FINN 200). For purposes of experimentation, the network (e.g., FINN 200) was trained using the publicly available Vimeo-90 k dataset from Xue et al. [R49]. This facilitate reproducibility and supports recent efforts in re-implementing frame interpolation methods, which voiced difficulties due to missing training data [R23]. The training portion of the Vimeo-90 k dataset consists of 51, 313 frame triples, each with a sequence of three consecutive frames at a resolution of 448×256 pixels. Therefore, the evaluations discussed herein involved only supervising the training of the model at t=0.5, which may hurt the generalization capability of the approach discussed herein when interpolation frames at different t. However, the evaluation discussed infra shows that the model of the present embodiments trained at t=0.5 can still successfully interpolate frames at an arbitrary temporal position.

In addition, online data augmentation may also be performed during training. For example, instead of training on the original frame triples of the Vimeo-90 k dataset, the experimental model was trained on random crops of 256× 256 pixels. This allows any potential priors in the spatial motion composition to be alleviated within the training dataset. Furthermore, training involved randomly flipping the cropped triples both horizontally as well as vertically, and likewise randomly reversing the temporal order.

In one example implementation, the FINN 200 pipeline may be developed using PyTorch, which is an open-source machine learning library for the Python programming language based on the Torch library and scientific computing framework. A custom Compute Unified Device Architecture (CUDA) layer, developed using the Nvidia® CUDA® Toolkit, may also be utilized to efficiently perform the forward warping. This setup allows a 720p frame to be synthesized in 0.405 seconds and a 1080p frame in 0.913 seconds when running on a Nvidia® Titan X® and using PWC-Net [R44] to estimate the optical flow. Additionally, FPE 300 and FSN 400 have relatively few weights which only amount to 17 megabytes when stored.

2. EXPERIMENTS

The FPW embodiments discussed herein were evaluated and compared to currently available techniques quantitatively and qualitatively on publicly available datasets.

Methods. The FPW embodiments were compared to several conventional video frame interpolation methods for which reference implementations are available. A first conventional method includes motion detail preserving (MDP)-Flow2 [R48] as a representative method based on optical flow and combine it with the frame synthesis algorithm from Baker et al. [R02] to generate interpolated frames. A second conventional method includes ToFlow [R49] algorithm due to its task-specific optical flow formulation. A third conventional method includes Sep-Conv [R36], which performs motion compensation implicitly. The conventional methods also include Voxel Flow [R30], Super SloMo [R16] and CtxSyn [R34].

Datasets. The quantitative evaluation was performed on common datasets for frame interpolation that are publicly available. This includes the Vimeo-90 k [R49] test dataset which spans 3, 782 examples as well as the dataset from Liu et al. [R30] who extracted 379 examples from UCF101 [R42]. The results were also compared with the interpolation portion of the Middlebury optical flow benchmark. In order to evaluate multi-frame video interpolation, the high frame-rate Sintel dataset was acquired from the authors of Slow Flow [R19].

Metrics. Peak-signal-to-noise ratio (PSNR) and structural similarity (SSIM) [R45] were used for all quantitative comparisons. The Learned Perceptual Image Patch Similarity (LPIPS) [R50] metric, which strives to measure the perceptual similarity, was also incorporated. In particular, Version 0.1 of this metric was utilized for the experiment, linearly calibrated on AlexNet [R25]. While higher values indicate better results in terms of PSNR and SSIM, lower values indicate better results with the LPIPS metric. To avoid confusion, arrows are used within the tables discussed infra to denote this difference.

2.1. Analysis of the Feature Pyramid Warping Embodiments

Analysis of the FPW embodiments involves comparing the FPW embodiments with off-the-shelf optical flow methods, including a comparison of a baseline that combines this optical flow method with a standard frame synthesis algorithm to interpolate frames [R02]. The analysis also involves analyzing whether the FPW embodiments heavily depend on the performance of the utilized optical flow method or whether the FPW embodiments generalize well. Additionally, since the FINN 200 pipeline is fully differentiable, the analysis involves analyzing the effect of fine-tuning the OFEs 215 for the task of frame interpolation. Furthermore, the analysis involves analyzing patterns that the FPE 300 focuses on and whether they are different from feature pyramids used for motion estimation. Moreover, the analysis considers two different loss functions to train the FPW model. For simplicity, only LIAp was used for the experiments discuss the effect of using $L_F$ infra.

FIG. 1T includes table 1, which shows baseline comparisons on two different optical flow methods, FlowNet2 [R17] and PWC-Net [R44]. The baseline comparisons consider two state-of-the-art optical flow methods, namely, FlowNet2 [R17] and PWC-Net [R44]. Each of these methods were combined with a classic frame synthesis algorithm provided by *Baker et al.* [R02] as baselines, denoted as "FlowNet2-Classic" and "PWC-Net-Classic," respectively. Both of these optical flow networks are trained on the FlyingChairs dataset [R07]. We further evaluate two versions of the FPW embodiments, including one with FlowNet2 and the other with PWC-Net (alternatives to PWC-Net=Lite FlowNet, SpyNet, MDP-Flow2), denoted as "FlowNet2-FPW" and "PWC-Net-FPW," respectively. As shown by table 1, FPW embodiments significantly improve upon the baseline interpolation algorithms and do so consistently regardless of the optical flow algorithm used in the FPW embodiments. Since FlowNet2 and PWC-Net perform similarly well within the FIN 200 interpolation pipeline and PWC-Net has fewer parameters, these versions are used in subsequent experiments.

As mentioned previously, since the FINN 200 pipeline is fully differentiable, the optical flow method may be fine-tuned for the task of video frame interpolation. As shown by table 1 in FIG. 1T, fine-tuning the optical flow network (PWC-Net) can further improve the performance of the FPW embodiments (PWC-Netft-FPW). For this reason, this version of the FPW embodiments is used in the subsequent experiments. It should also be noted that the fine-tuned PWC-Net the FPW embodiments also improves results with the interpolation algorithm from [R02].

Figure 5:
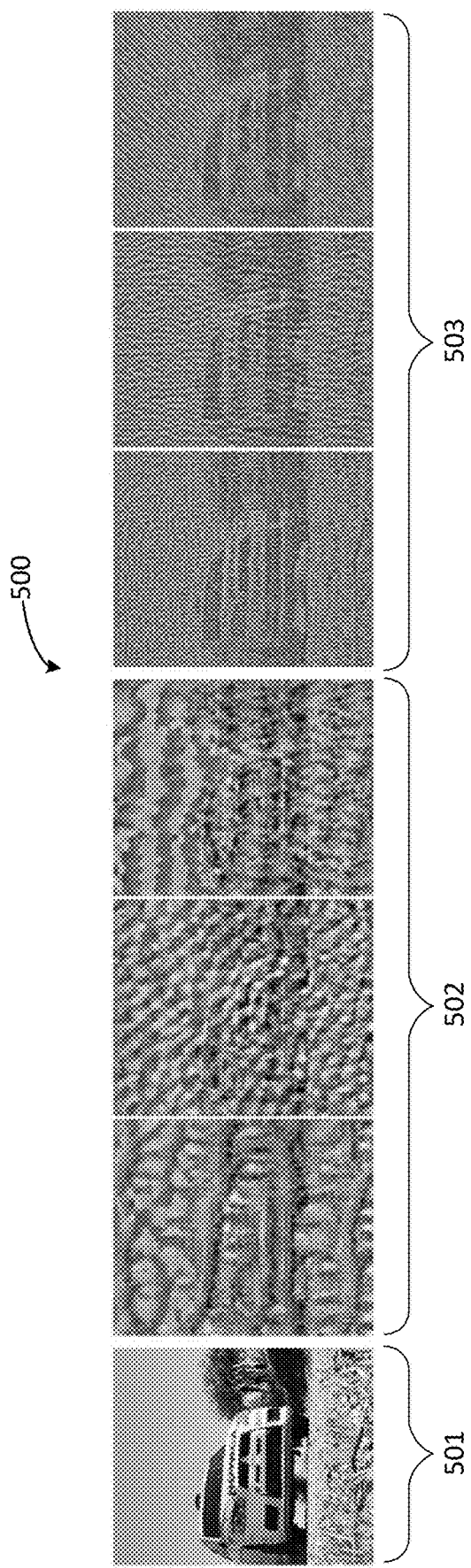
FIG. 5 depicts example features extracted from different task-specific feature pyramids according to [R08].

FIG. 5 shows a visualization example 500 of the features extracted from different task-specific feature pyramids according to [R08]. As mentioned previously, the FPEs 300 are trained jointly with the FSN 400, allowing it to gather task-specific features for frame interpolation. To examine the difference between feature pyramids for frame interpolation and those for motion estimation, a filter visualization technique from [R08] was employed. In particular, the activations of the last layer 503 of the FPE 300 was maximized by altering the input image 501. Similarly, the activations of an equivalent layer 502 of the PWC-Net [R44] was maximized to compare them to the FPW embodiments. FIG. 5 shows a set of representative feature activations. The feature pyramid 503 of the FPW embodiments focuses on local patterns while the feature pyramid 502 from PWC-Net exhibits large patterns. This may be attributed to the explicit motion compensation in the FPW embodiments by warping the feature pyramids according to the motion between input frames. This allows the FPE 300 to focus more on fine details that are important for synthesizing a high-quality interpolation result.

2.2. Quantitative Evaluation

FIG. 2T includes table 2, which shows a quantitative comparison of various conventional video frame interpolation methods and the FPW embodiments on several public datasets. As shown by table 2, the FPW embodiments trained with $L_{LAP}$ loss consistently outperforms all other conventional methods in terms of PSNR and SSIM, whereas the FPW embodiments trained with $L_F$ loss performs best in terms of LPIPS. This is consistent with the report from previous work that employed both types of losses for video frame interpolation [R34], [R36] in that a perceptual loss, like $L_F$, leads to perceptually more pleasant results while other losses, such as $L_{LAP}$, favor numerical metrics like SSIM and PSNR.

The interpolation results from the FPW embodiments trained with $L_{LAP}$ loss were also compared with the relevant Middlebury optical flow benchmark [R02] that also evaluates frame interpolation. This benchmark uses a root-mean-square interpolation error (IE) and its gradient-normalized counterpart (NE) as metrics. FIG. 3T includes table 3 (including both table 3a and table 3b), which shows a quantitative ranking on the relevant interpolation category of the Middlebury benchmark for optical flow [R02]. As shown by table 3, the FPW embodiments significantly outperforms the conventional interpolation methods, on average by 1.02 dB when compared to the second-best conventional method. At the time of experimentation, the FPW embodiments ranked 1st among all the 158 methods reported on the benchmark.

Figure 6A:
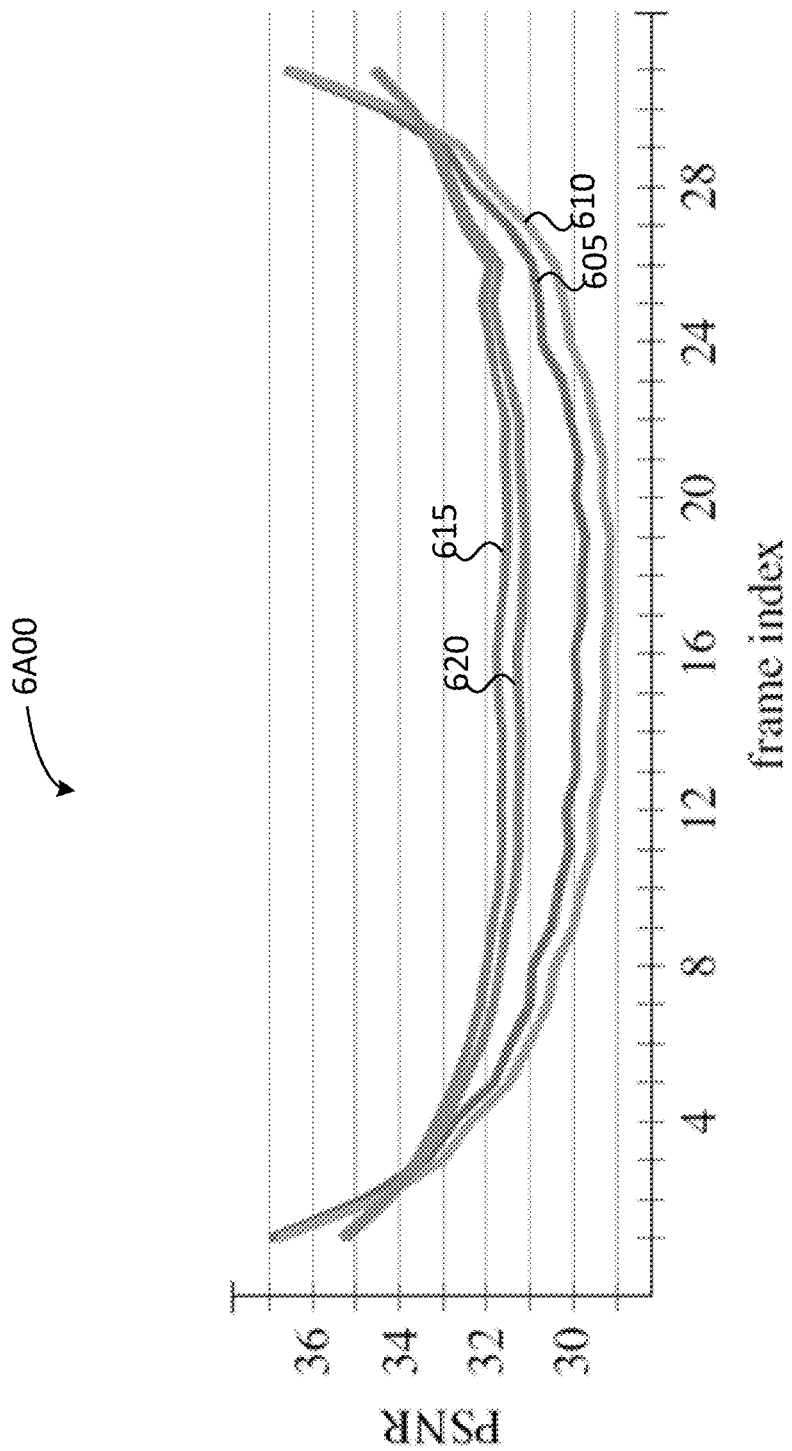
FIGS. 6A and 6B show an assessment of the multi-frame interpolation capability of the feature pyramid warping embodiments on the high frame-rate Sintel dataset [R19].
Figure 6B:
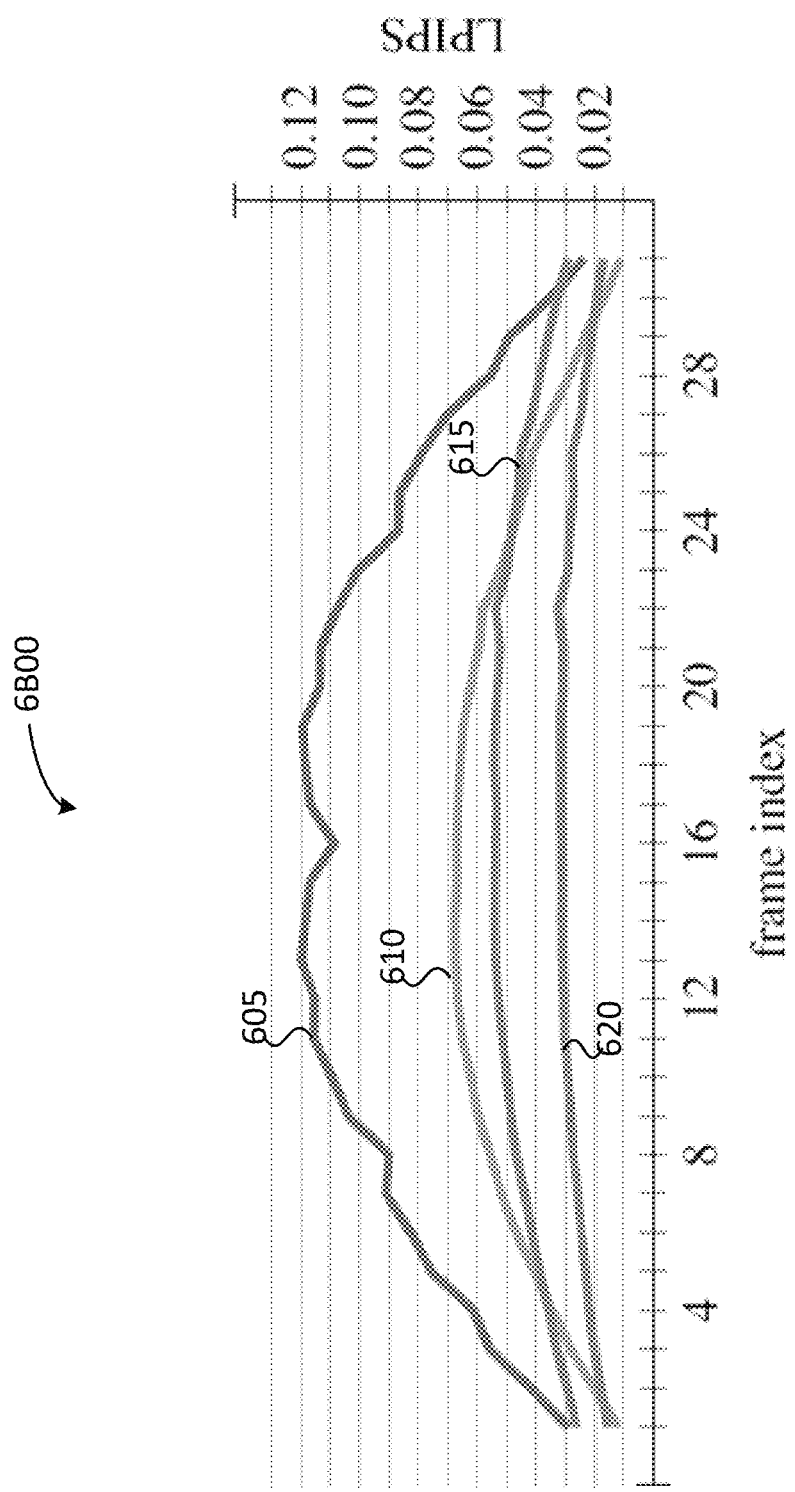

FIGS. 6A and 6B shows graphs 6A00 and 6B00, respectively, which are an assessment of the multi-frame interpolation capability of the FPW embodiments on the high frame-rate Sintel dataset [R19]. Since the FPW embodiments explicitly compensate for motion via warping, the FPW embodiments are able to warp the feature pyramids of the input frames to an arbitrary temporal position. Therefore, the FPW embodiments can seamlessly interpolate multiple frames in between two given ones. To quantitatively evaluate this property, the high framerate version of the Sintel benchmark was obtained from the authors of Slow Flow [R19], and frames 1 through 31 were interpolated from frame 0 and frame 32 on all 13 scenes. The FPW embodiments were then compared to SepConv [R36], which does not naturally support multi-frame interpolation. Therefore, a recursive interpolation scheme was employed for SepConv in order to predict multiple intermediate frames. In particular, graph 6A00 in FIG. 6A shows a PSNR evaluation for SepConv-$L_1$ 605, SepConv-$L_F$ 610, FPW-$L_{Lap}$ 615, and FPW-$L_F$ 620, and graph 6B00 in FIG. 6B shows a LPIPS evaluation for SepConv-$L_1$ 605, SepConv-$L_F$ 610, FPW-$L_{Lap}$ 615, and FPW-$L_F$ 620. As shown by graphs 6A00 and 6B00 of FIGS. 6A and 6B, the FPW embodiments are able to predict high-quality interpolation results at arbitrary t despite only being supervised on t=0.5. Regarding the two loss functions, it can once more be seen that the FPW model trained with $L_{LAP}$ loss performs better in terms of PSNR while our model trained with $L_F$ loss performs better in terms of LPIPS.

2.3. Qualitative Evaluation

Figure 7A:
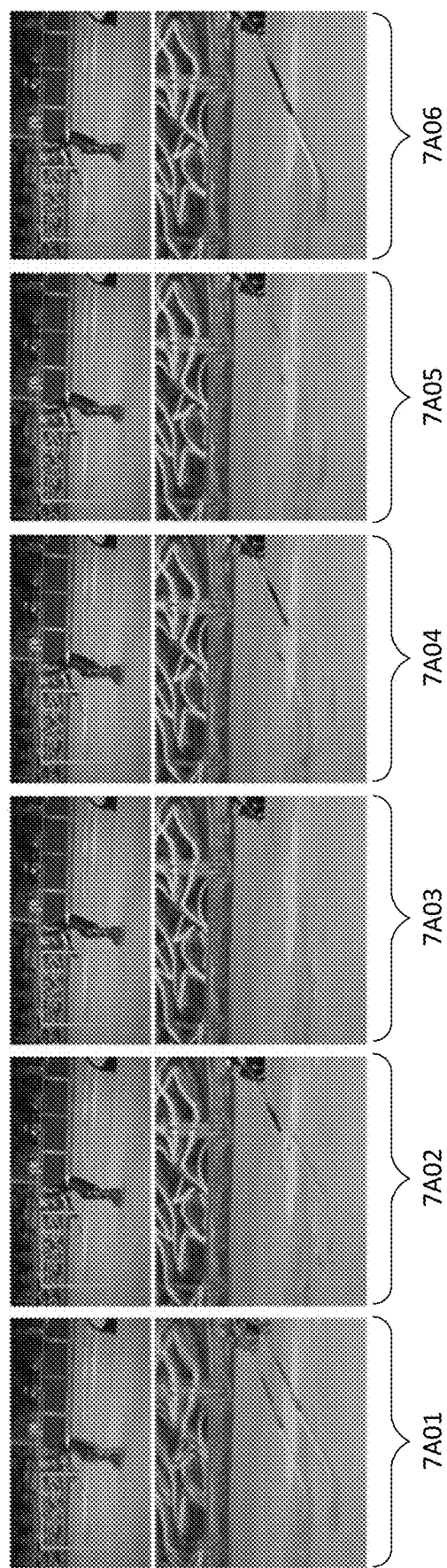
FIGS. 7A, 7B, and 7C show interpolation results for three difficult video interpolation examples, including a comparison of the feature pyramid warping embodiments with several conventional video interpolation techniques.
Figure 7B:
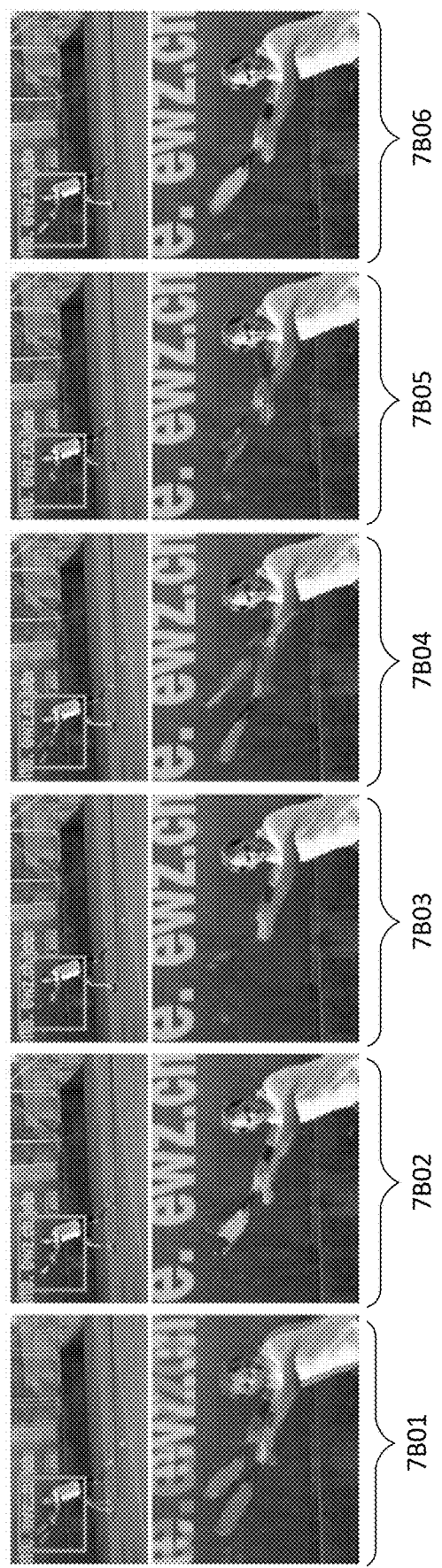
Figure 7C:
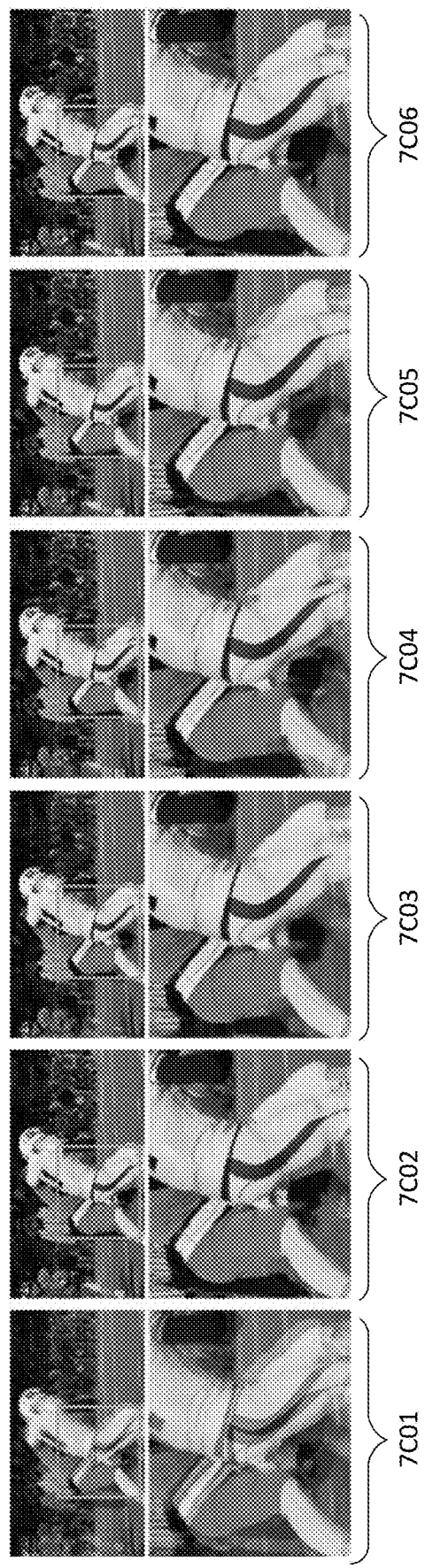

FIGS. 7A, 7B, and 7C show interpolation results for three difficult examples, where FIG. 7A shows a hockey stick example, FIG. 7B shows a tennis racquet example, and FIG. 7C shows a football player example. Each of FIGS. 7A, 7B, and 7C compare the FPW embodiments with several conventional methods. The interporlation results include results 7A01 in FIG. 7A, 7B01 in FIGS. 7B, and 7C01 in FIG. 7C from using overlayed input frames, results 7A02 in FIG. 7A, 7B02 in FIGS. 7B, and 7C02 in FIG. 7C from using MDP-Flow2 [R48], results 7A03 in FIG. 7A, 7B03 in FIG. 7B, and 7C03 in FIG. 7C from using ToFlow [R49], results 7A04 in FIG. 7A, 7B04 in FIG. 7B, and 7B04 in FIG. 7C from using SepConv-PF [R36], results 7A05 in FIG. 7A, 7B05 in FIG. 7B, and 7C05 in FIG. 7C from using CtxSyn-PF [R34], and results 7A06 in FIG. 7A, 7B06 in FIG. 7B, and 7C06 in FIG. 7C from using FPW-Pf.

Figure 7D:
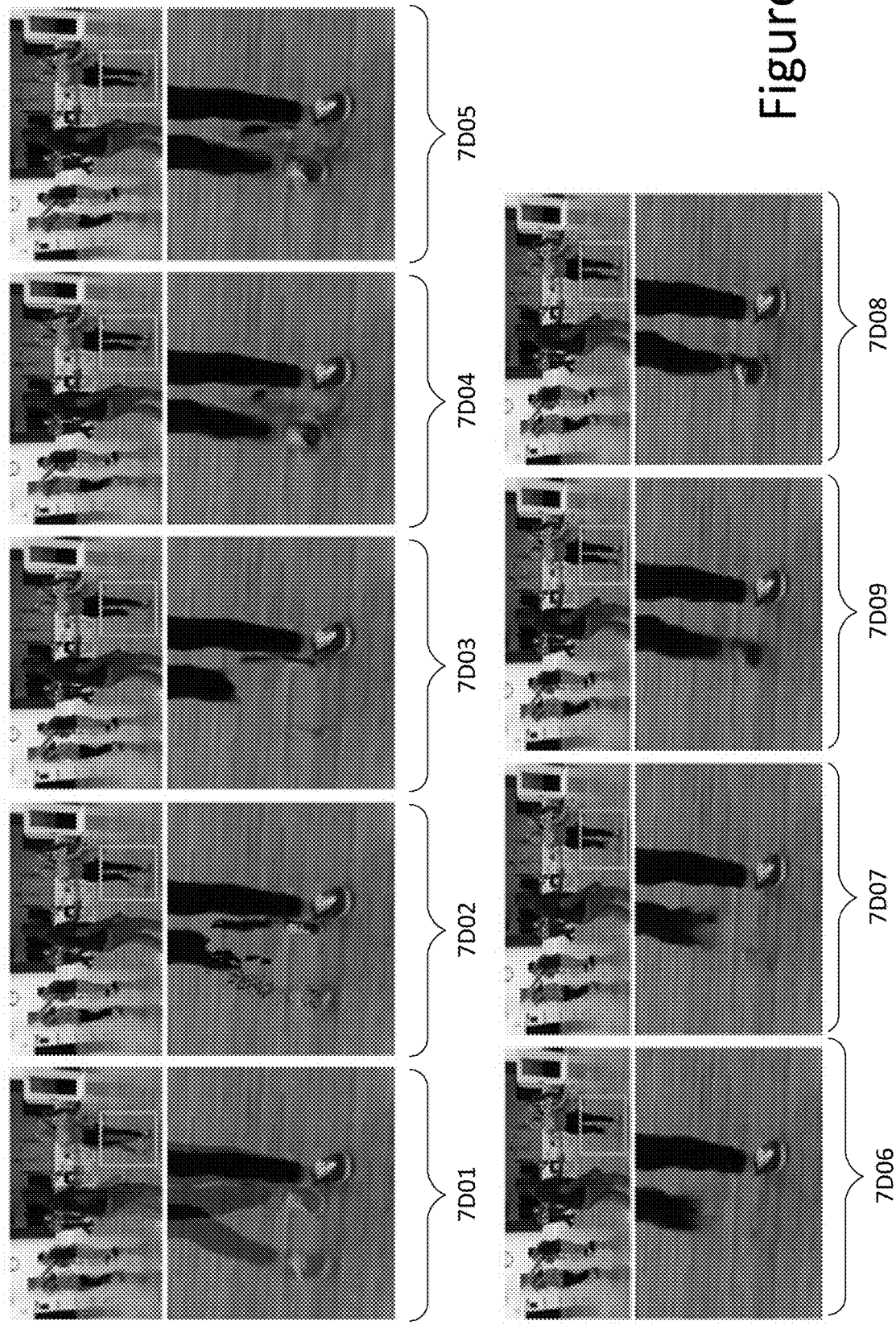
Figure 7E:
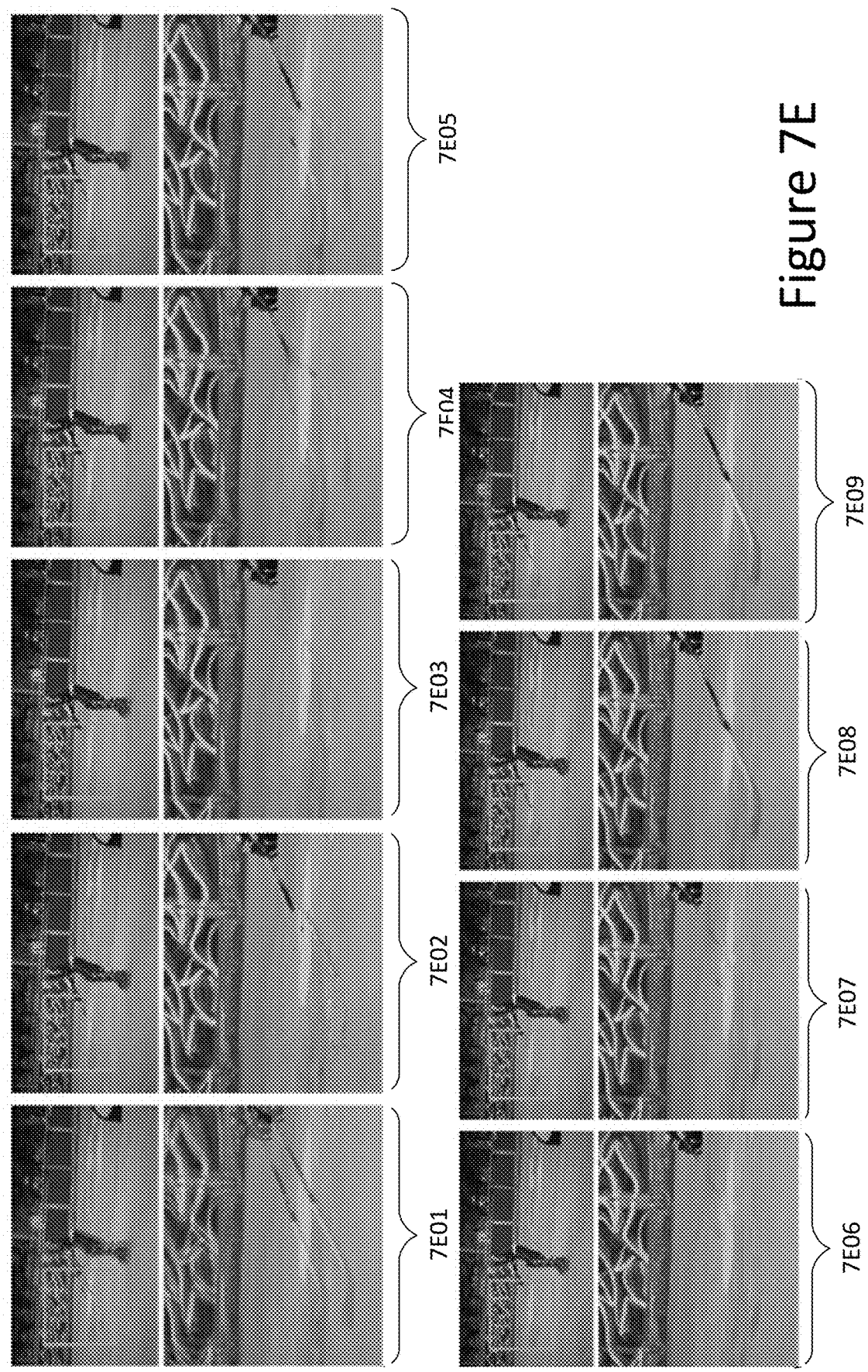
Figure 7G:
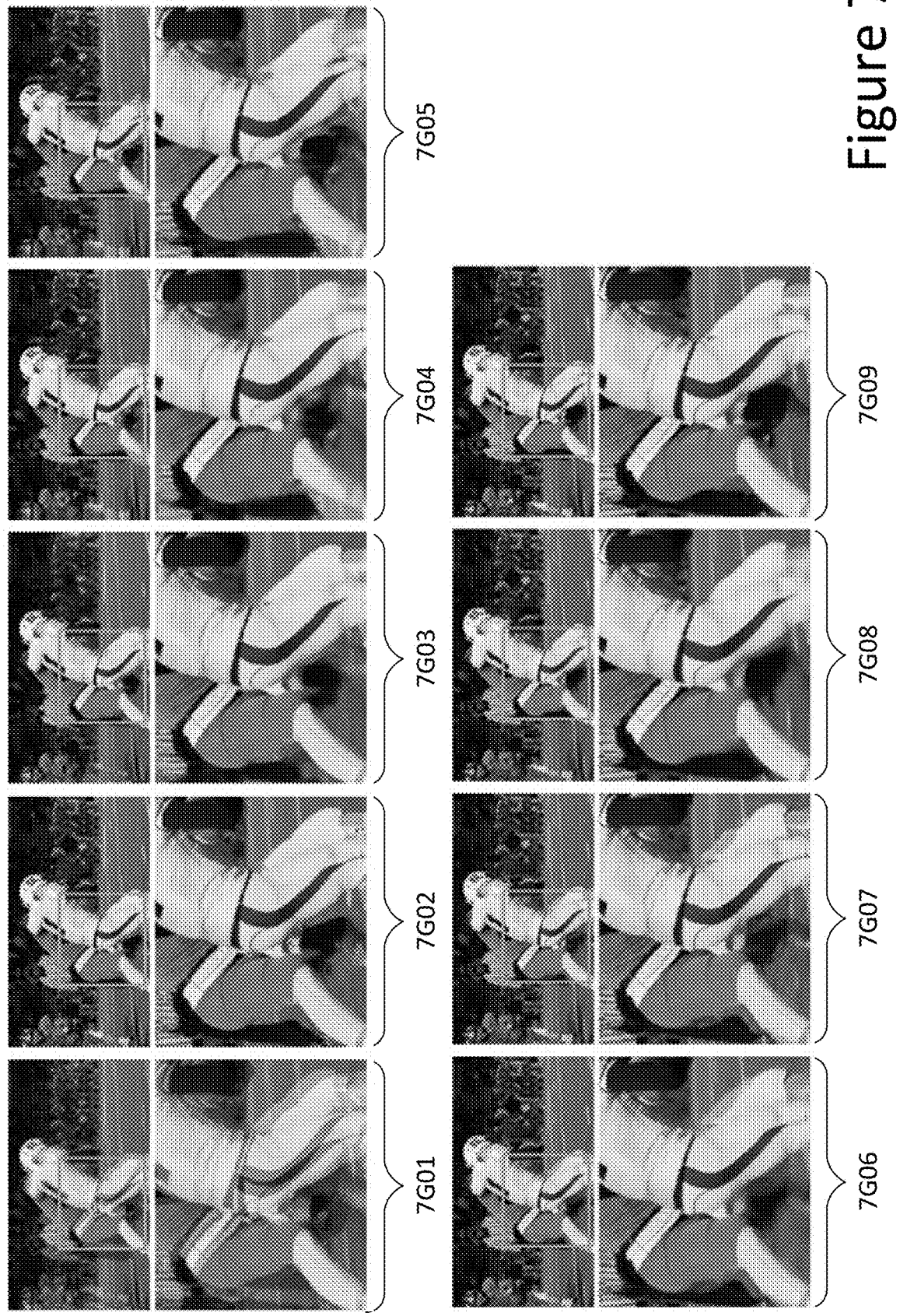

FIGS. 7D, 7E, 7F, and 7G show additional interpolation results for four difficult examples, where FIG. 7D shows a dancing example, FIG. 7E shows a hockey stick example, FIG. 7F shows a tennis racquet example, and FIG. 7G shows a football player example, comparing the FPW embodiments with several conventional methods. The interporlation results include results 7D01 in FIG. 7D, 7E01 in FIG. 7E, 7F01 in FIG. 7F, and 7G01 in FIG. 7G from using overlayed input frames, results 7D02 in FIG. 7D, 7E02 in FIG. 7E, 7F02 in FIG. 7F, and 7G02 in FIG. 7G from using MDP-Flow2 [R48], results 7D03 in FIG. 7D, 7E03 in FIG. 7E, 7F03 in FIG. 7F, and 7G03 in FIG. 7G from using ToFlow [R49], results 7D04 in FIG. 7D, 7E04 in FIG. 7E, 7F04 in FIG. 7F, and 7G04 in FIG. 7G from using SepConv-L1 [R36], results 7D05 in FIG. 7D, 7E05 in FIG. 7E, 7F05 in FIG. 7F, and 7G05 in FIG. 7G from from using SepConv-$L_F$ [R36], results 7B06 from using CtxSyn-Stap [R34], results 7D06 in FIG. 7D, 7E06 in FIG. 7E, 7F06 in FIG. 7F, and 7G06 in FIG. 7G from using CtxSyn-$L_{Lap}$ [R36], results 7D07 in FIG. 7D, 7E07 in FIG. 7E, 7F07 in FIG. 7F, and 7G07 in FIG. 7G from using CtxSyn-$L_F$ [R34], results 7D08 in FIG. 7D, 7E08 in FIG. 7E, 7F08 in FIG. 7F, and 7G08 in FIG. 7G from using FPW-Liap, and results 7D09 in FIG. 7D, 7E09 in FIG. 7E, 7F09 in FIG. 7F, and 7G09 in FIG. 7G from using FPW-$L_F$.

Due to the space limit, the results of all interpolation methods that were compared are not shown in any of FIGS. 7A-7G. Furthermore, for methods with models trained using different losses, the results for the models that focus on the perceptual quality are shown. The hockey stick example (FIGS. 7A and 7E) and the tennis racquet example (FIGS. 7B and 7F) pose a challenge due to their slim structure and significant motion. By integrating feature pyramids that can retain this information across multiple scales, the FPW embodiments handle these scenarios better than the conventional techniques. The leg of the football player on the left in the football player example (FIGS. 7C and 7G) is subject to large motion, occlusion, and changes in brightness. Once again, the FPW embodiments handle this challenging case more robustly than the conventional techniques.

Figure 8A:
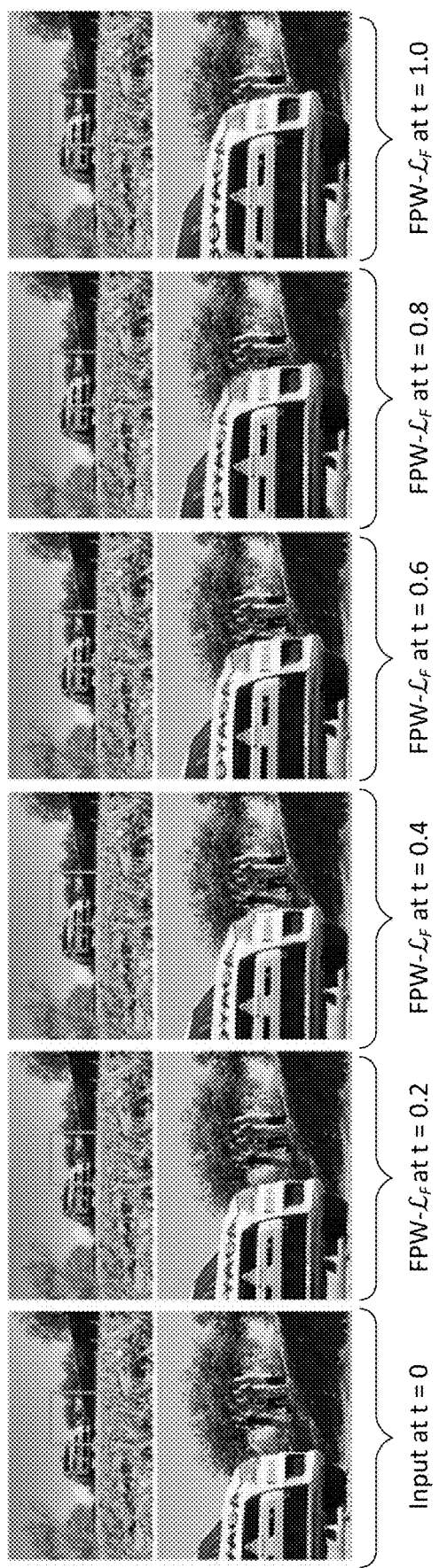
FIGS. 8A and 8B show a demonstration of multi-frame interpolation capabilities of the feature pyramid warping embodiments on two difficult video interpolation scenarios.
Figure 8B:
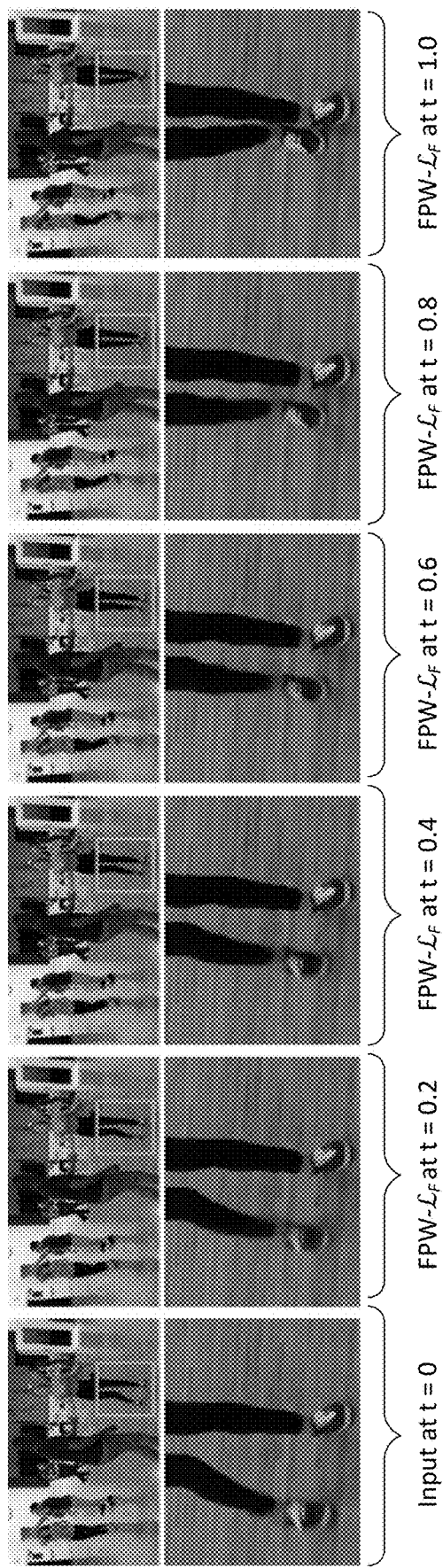

FIGS. 8A and 8B show multi-frame interpolation capabilities on two difficult video interpolation scenarios according to various FPW embodiments, where FIG. 8A shows a moving vehicle example and FIG. 8B shows a dancing example. FIGS. 8A and 8B show two multi-frame interpolation results of the FPW embodiments including input at t=0, FPW-$L_F$ at t=0.2, FPW-$L_F$ at t=0.4, FPW-$L_F$ at t=0.6, FPW-$L_F$ at t=0.8, and FPW-$L_F$ at t=1.0. While the quantitatively effectiveness of the FPW embodiments has already been demonstrated in this scenario, the provided examples show that the multi-frame interpolation result of the FPW embodiments is temporally consistent.

As mentioned previously, video frame interpolation is not limited to synthesizing novel views in time. Instead, video frame interpolation can also be employed for novel view interpolation in space [R09], including synthesizing novel views in stereo as well as light-field imagery [R22]. In this way, the FPW embodiments for video frame interpolation can successfully perform novel view interpolation for applications like auto-stereoscopic and light field content production.

3. SUMMARY

The FPW embodiments discussed herein provide high quality video frame interpolation in comparison to conventional frame interpolation techniques. The FPW embodiments use a neural network to extract feature pyramids for two input frames, and pre-warps the feature pyramids together with the input frames to the target temporal location using an estimated optical flow. The pre-warped pyramids and input frames are fed to a frame synthesis network to produce interpolation results. The combination of using a feature pyramid as an image representation and the pre-warping of feature pyramids allows the FPW embodiments to focus on fine details needed for high quality image synthesis. The joint training of the feature pyramid extractor network and the frame synthesis network further optimizes both networks for the task of frame interpolation. As shown in experiments, the FPW embodiments successfully interpolates frames for challenging scenarios and establishes an improvement in the video frame interpolation arts. The improvements in the video frame interpolation arts constitutes an improvement in the functioning of computing devices and systems that utilize computer vision applications, such as augmented reality, optical character recognition, image and/or video searching, autonomous or computer-aided vehicle operation, facial recognition, gesture recognition, handwriting recognition, robotics and/or robotic navigation, remote sensing, and/or the like. Since the FPW embodiments discussed herein are an improvement over conventional video interpolation techniques, the FPW embodiments are also an improvement in the functioning of computer devices/systems themselves because the FPW embodiments provide a more efficient use of computational resources provides better results than the conventional video interpolation techniques. The improvement to the functioning of the computing systems/devices themselves is based at least one conservation of computational and memory resources when performing video interpolation.

While the FPW embodiments include a supervised model only using examples at t=0.5, the aforementioned evaluation shows that the FPW embodiments can interpolate a frame at an arbitrary temporal location with high quality. In addition, the FPW embodiments may create even better results when trained on multiple intermediate frames.

The FPW embodiments build upon previous research on video frame interpolation and employ a color loss and a perceptual loss to train an FPW interpolation neural network (e.g., the FSN 400 of FIGS. 2 and 4). The experiments discussed herein show that these networks can produce high-quality interpolation results. Furthermore, the FPW embodiments discussed herein may be extended to include adversarial training, cycle consistency in image generation, and/or other like advanced techniques of supervising training.

4. HARDWARE SYSTEM IMPLEMENTATIONS AND CONFIGURATIONS

Figure 9:
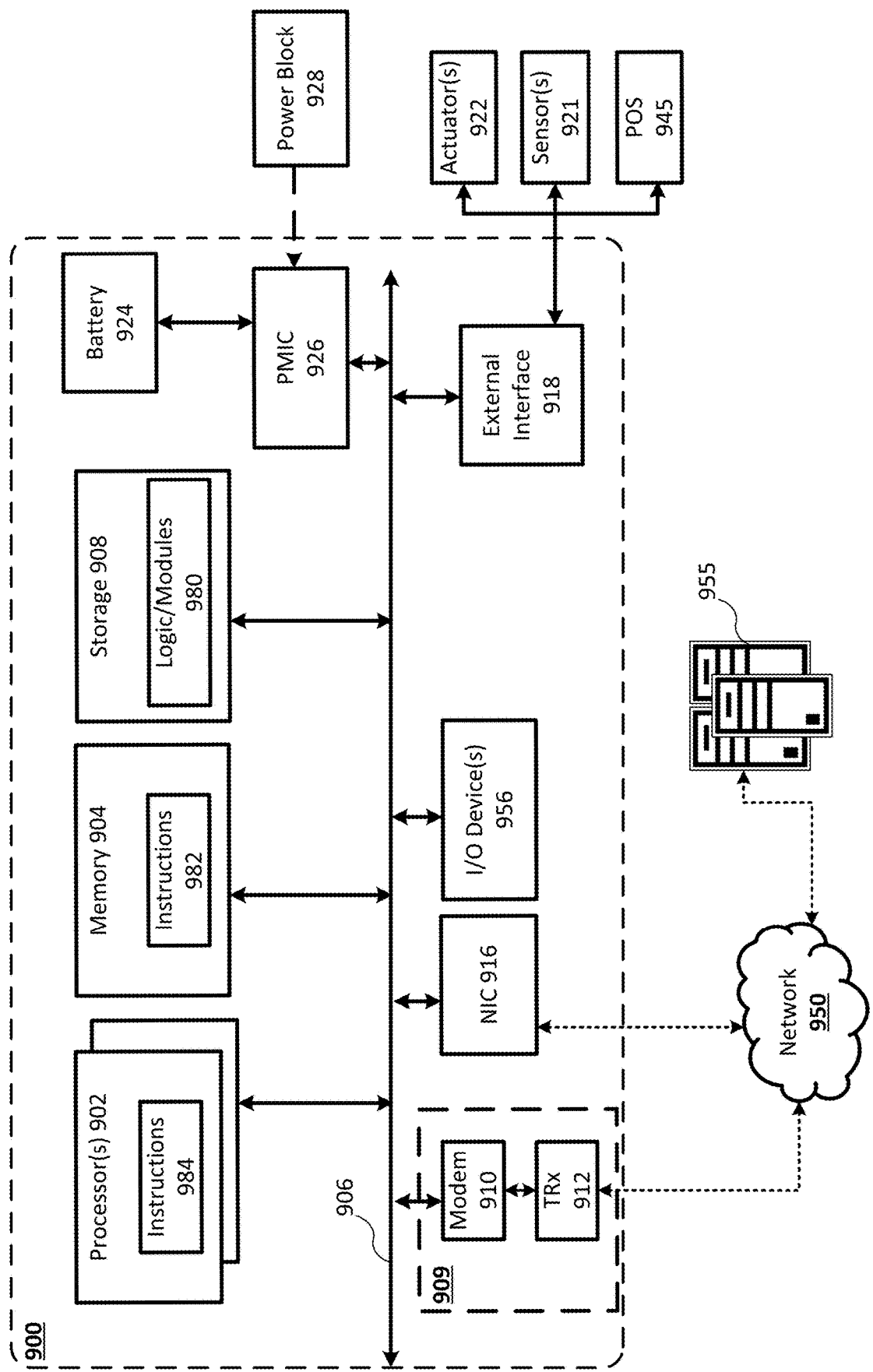
FIG. 9 illustrates an example computing system suitable for practicing various aspects of the present disclosure in accordance with various embodiments.

FIG. 9 illustrates an example of an computing system 900 (also referred to as "platform 900," "device 900," "appliance 900," or the like) in accordance with various embodiments. The system 900 may be suitable for use as any of the computer devices discussed herein. The components of system 900 may be implemented as an individual computer system, or as components otherwise incorporated within a chassis of a larger system. The components of system 900 may be implemented as integrated circuits (ICs) or other discrete electronic devices, with the appropriate logic, software, firmware, or a combination thereof, adapted in the computer system 900. Additionally or alternatively, some of the components of system 900 may be combined and implemented as a suitable System-on-Chip (SoC), System-in-Package (SiP), multi-chip package (MCP), or the like.

The system 900 includes physical hardware devices and software components capable of providing and/or accessing content and/or services to/from the remote system 955. The system 900 and/or the remote system 955 can be implemented as any suitable computing system or other data processing apparatus usable to access and/or provide content/services from/to one another. As examples, the system 900 and/or the remote system 955 may comprise desktop computers, a work stations, laptop computers, mobile cellular phones (e.g., "smartphones"), tablet computers, portable media players, wearable computing devices, server computer systems, an aggregation of computing resources (e.g., in a cloud-based environment), or some other computing devices capable of interfacing directly or indirectly with network 950 or other network. The system 900 communicates with remote systems 955, and vice versa, to obtain/serve content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), or Real-time Streaming Protocol (RTSP); Secure Shell (SSH), Extensible Messaging and Presence Protocol (XMPP); WebSocket; and/or some other communication protocol, such as those discussed herein.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). As used herein, the term "service" refers to a particular functionality or a set of functions to be performed on behalf of a requesting party, such as the system 900. As examples, a service may include or involve the retrieval of specified information or the execution of a set of operations. In order to access the content/services, the system 900 includes components such as processors, memory devices, communication interfaces, and the like. However, the terms "content" and "service" may be used interchangeably throughout the present disclosure even though these terms refer to different concepts.

Referring now to system 900, the system 900 includes processor circuitry 902, which is configured to execute program code, and/or sequentially and automatically carry out a sequence of arithmetic or logical operations; record, store, and/or transfer digital data. The processor circuitry 902 includes circuitry such as, but not limited to one or more processor cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 902 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein. Individual processors (or individual processor cores) of the processor circuitry 902 may be coupled with or may include memory/storage and may be configured to execute instructions stored in the memory/storage to enable various applications or operating systems to run on the system 900. In these embodiments, the processors (or cores) of the processor circuitry 902 are configured to operate application software (e.g., logic/modules 980) to provide specific services to a user of the system 900. In some embodiments, the processor circuitry 902 may include special-purpose processor/controller to operate according to the various embodiments herein.

In various implementations, the processor(s) of processor circuitry 902 may include, for example, one or more processor cores (CPUs), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), SoCs and/or programmable SoCs, microprocessors or controllers, or any suitable combination thereof. As examples, the processor circuitry 902 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 902 may be mentioned elsewhere in the present disclosure.

In some implementations, the processor(s) of processor circuitry 902 may be, or may include, one or more media processors comprising microprocessor-based SoC(s), FPGA(s), or DSP(s) specifically designed to deal with digital streaming data in real-time, which may include encoder/decoder circuitry to compress/decompress (or encode and decode) Advanced Video Coding (AVC) (also known as H.264 and MPEG-4) digital data, High Efficiency Video Coding (HEVC) (also known as H.265 and MPEG-H part 2) digital data, and/or the like.

In some implementations, the processor circuitry 902 may include one or more hardware accelerators. The hardware accelerators may be microprocessors, configurable hardware (e.g., FPGAs, programmable ASICs, programmable SoCs, DSPs, etc.), or some other suitable special-purpose processing device tailored to perform one or more specific tasks or workloads, for example, specific tasks or workloads of the subsystems of the FINN 200, which may be more efficient than using general-purpose processor cores. In some embodiments, the specific tasks or workloads may be off-loaded from one or more processors of the processor circuitry 902. In these implementations, the circuitry of processor circuitry 902 may comprise logic blocks or logic fabric including and other interconnected resources that may be programmed to perform various functions, such as the procedures, methods, functions, etc. of the various embodiments discussed herein. Additionally, the processor circuitry 902 may include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 902 may include hardware elements specifically tailored for machine learning functionality, such as for operating the subsystems of the FINN 200 discussed previously with regard to FIG. 2. In these implementations, the processor circuitry 902 may be, or may include, an AI engine chip that can run many different kinds of AI instruction sets once loaded with the appropriate weightings and training code. Additionally or alternatively, the processor circuitry 902 may be, or may include, AI accelerator(s), which may be one or more of the aforementioned hardware accelerators designed for hardware acceleration of AI applications, such as one or more of the subsystems of FINN 200. As examples, these processor(s) or accelerators may be a cluster of artificial intelligence (AI) GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 902 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

In some implementations, the processor(s) of processor circuitry 902 may be, or may include, one or more custom-designed silicon cores specifically designed to operate corresponding subsystems of the FINN 200. These cores may be designed as synthesizable cores comprising hardware description language logic (e.g., register transfer logic, verilog, Very High Speed Integrated Circuit hardware description language (VHDL), etc.); netlist cores comprising gate-level description of electronic components and connections and/or process-specific very-large-scale integration (VLSI) layout; and/or analog or digital logic in transistor-layout format. In these implementations, one or more of the subsystems of the FINN 200 may be operated, at least in part, on custom-designed silicon core(s). These "hardware-ized" subsystems may be integrated into a larger chipset but may be more efficient that using general purpose processor cores.

The system memory circuitry 904 comprises any number of memory devices arranged to provide primary storage from which the processor circuitry 902 continuously reads instructions 982 stored therein for execution. In some embodiments, the memory circuitry 904 is on-die memory or registers associated with the processor circuitry 902. As examples, the memory circuitry 904 may include volatile memory such as random access memory (RAM), dynamic RAM (DRAM), synchronous DRAM (SDRAM), etc. The memory circuitry 904 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 904 may also comprise persistent storage devices, which may be temporal and/or persistent storage of any type, including, but not limited to, non-volatile memory, optical, magnetic, and/or solid state mass storage, and so forth.

Storage circuitry 908 is arranged to provide persistent storage of information such as data, applications, operating systems (OS), and so forth. As examples, the storage circuitry 908 may be implemented as hard disk drive (HDD), a micro HDD, a solid-state disk drive (SSDD), flash memory cards (e.g., SD cards, microSD cards, XD picture cards, and the like), USB flash drives, on-die memory or registers associated with the processor circuitry 902, resistance change memories, phase change memories, holographic memories, or chemical memories, and the like.

The storage circuitry 908 is configured to store computational logic 980 (or "modules 980") in the form of software, firmware, microcode, or hardware-level instructions to implement the techniques described herein. The computational logic 980 may be employed to store working copies and/or permanent copies of programming instructions, or data to create the programming instructions, for the operation of various components of system 900 (e.g., drivers, libraries, application programming interfaces (APIs), etc.), an OS of system 900, one or more applications, and/or for carrying out the embodiments discussed herein. The computational logic 980 may be stored or loaded into memory circuitry 904 as instructions 982, or data to create the instructions 982, which are then accessed for execution by the processor circuitry 902 to carry out the functions described herein. The processor circuitry 902 accesses the memory circuitry 904 and/or the storage circuitry 908 over the interconnect (IX) 906. The instructions 982 to direct the processor circuitry 902 to perform a specific sequence or flow of actions, for example, as described with respect to flowchart(s) and block diagram(s) of operations and functionality depicted previously. The various elements may be implemented by assembler instructions supported by processor circuitry 902 or high-level languages that may be compiled into instructions 984, or data to create the instructions 984, to be executed by the processor circuitry 902. The permanent copy of the programming instructions may be placed into persistent storage devices of storage circuitry 908 in the factory or in the field through, for example, a distribution medium (not shown), through a communication interface (e.g., from a distribution server (not shown)), or over-the-air (OTA).

The operating system (OS) of system 900 may be a general purpose OS or an OS specifically written for and tailored to the computing system 900. For example, when the system 900 is a server system or a desktop or laptop system 900, the OS may be Unix or a Unix-like OS such as Linux e.g., provided by Red Hat Enterprise, Windows 10™ provided by Microsoft Corp.®, macOS provided by Apple Inc.®, or the like. In another example where the system 900 is a mobile device, the OS may be a mobile OS, such as Android® provided by Google Inc.®), iOS® provided by Apple Inc.®, Windows 10 Mobile® provided by Microsoft Corp., KaiOS provided by KaiOS Technologies Inc., or the like.

The OS manages computer hardware and software resources, and provides common services for various applications (e.g., application 110). The OS may include one or more drivers or APIs that operate to control particular devices that are embedded in the system 900, attached to the system 900, or otherwise communicatively coupled with the system 900. The drivers may include individual drivers allowing other components of the system 900 to interact or control various I/O devices that may be present within, or connected to, the system 900. For example, the drivers may include a display driver to control and allow access to a display device, a touchscreen driver to control and allow access to a touchscreen interface of the system 900, sensor drivers to obtain sensor readings of sensor circuitry 921 and control and allow access to sensor circuitry 921, actuator drivers to obtain actuator positions of the actuators 922 and/or control and allow access to the actuators 922, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 900, such as the various subsystems of the FINN 200 discussed previously.

The components of system 900 communicate with one another over the interconnect (IX) 906. The IX 906 may include any number of IX technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 906 may be a proprietary bus, for example, used in a SoC based system.

The communication circuitry 909 is a hardware element, or collection of hardware elements, used to communicate over one or more networks (e.g., network 950) and/or with other devices. The communication circuitry 909 includes modem 910 and transceiver circuitry ("TRx") 812. The modem 910 includes one or more processing devices (e.g., baseband processors) to carry out various protocol and radio control functions. Modem 910 may interface with application circuitry of system 900 (e.g., a combination of processor circuitry 902 and CRM 860) for generation and processing of baseband signals and for controlling operations of the TRx 912. The modem 910 may handle various radio control functions that enable communication with one or more radio networks via the TRx 912 according to one or more wireless communication protocols. The modem 910 may include circuitry such as, but not limited to, one or more single-core or multi-core processors (e.g., one or more baseband processors) or control logic to process baseband signals received from a receive signal path of the TRx 912, and to generate baseband signals to be provided to the TRx 912 via a transmit signal path. In various embodiments, the modem 910 may implement a real-time OS (RTOS) to manage resources of the modem 910, schedule tasks, etc.

The communication circuitry 909 also includes TRx 912 to enable communication with wireless networks using modulated electromagnetic radiation through a non-solid medium. TRx 912 includes a receive signal path, which comprises circuitry to convert analog RF signals (e.g., an existing or received modulated waveform) into digital baseband signals to be provided to the modem 910. The TRx 912 also includes a transmit signal path, which comprises circuitry configured to convert digital baseband signals provided by the modem 910 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 912 using metal transmission lines or the like.

The TRx 912 may include one or more radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 8 (3rd Generation Partnership Project Release 8), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth (r), Bluetooth Low Energy (BLE), IEEE 802.15.4 based protocols (e.g., IPv6 over Low power Wireless Personal Area Networks (6LoWPAN), WirelessHART, MiWi, Thread, 1600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), LoRaWAN™ (Long Range Wide Area Network), Sigfox, Wireless Gigabit Alliance (WiGig) standard, mmWave standards in general (wireless systems operating at 10-300 GHZ and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHZ to 5,905 GHZ), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHZ)), etc., In addition to the standards listed above, any number of satellite uplink technologies may be used for the TRx 912 including, for example, radios compliant with standards issued by the ITU (International Telecommunication Union), or the ETSI (European Telecommunications Standards Institute), among others, both existing and not yet formulated.

Network interface circuitry/controller (NIC) 916 may be included to provide wired communication to the network 950 or to other devices using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 900 via NIC 916 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 916 may include one or more dedicated processors and/or FPGAs to communicate using one or more of the aforementioned network interface protocols. In some implementations, the NIC 916 may include multiple controllers to provide connectivity to other networks using the same or different protocols. For example, the system 900 may include a first NIC 916 providing communications to the cloud over Ethernet and a second NIC 916 providing communications to other devices over another type of network. In some implementations, the NIC 916 may be a high-speed serial interface (HSSI) NIC to connect the system 900 to a routing or switching device.

Network 950 comprises computers, network connections among various computers (e.g., between the system 900 and remote system 955), and software routines to enable communication between the computers over respective network connections. In this regard, the network 950 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 950 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/ depacketizing data, modulating/demodulating signals, implementation of protocols stacks, and the like. More than one network may be involved in a communication session between the illustrated devices. Connection to the network 950 may require that the computers execute software routines which enable, for example, the seven layers of the OSI model of computer networking or equivalent in a wireless (or cellular) phone network.

The network 950 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 950 may be associated with network operator who owns or controls network equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The external interface 918 (also referred to as "I/O interface circuitry" or the like) is configured to connect or coupled the system 900 with external devices or subsystems. The external interface 918 may include any suitable interface controllers and connectors to couple the system 900 with the external components/devices. As an example, the external interface 918 may be an external expansion bus (e.g., Universal Serial Bus (USB), FireWire, Thunderbolt, etc.) used to connect system 100 with external (peripheral) components/devices. The external devices include, inter alia, sensor circuitry 921, actuators 922, and positioning circuitry 945, but may also include other devices or subsystems not shown by FIG. 9.

The sensor circuitry 921 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 918 connects the system 900 to actuators 924, allow system 900 to change its state, position, and/or orientation, or move or control a mechanism or system. The actuators 922 comprise electrical and/or mechanical devices for moving or controlling a mechanism or system, and converts energy (e.g., electric current or moving $α_rr$ and/or liquid) into some kind of motion. The actuators 922 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 922 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 900 may be configured to operate one or more actuators 922 based on one or more captured events and/or instructions or control signals received from a service provider and/or various client systems. In embodiments, the system 900 may transmit instructions to various actuators 922 (or controllers that control one or more actuators 922) to reconfigure an electrical network as discussed herein.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the communication circuitry 909 to communicate with the nodes and components of the positioning network. The positioning circuitry 945 may also provide position data and/or time data to the application circuitry, which may use the data to synchronize operations with various infrastructure (e.g., radio base stations), for turn-by-turn navigation, or the like.

The input/output (I/O) devices 956 may be present within, or connected to, the system 900. The I/O devices 956 include input device circuitry and output device circuitry including one or more user interfaces designed to enable user interaction with the system 900 and/or peripheral component interfaces designed to enable peripheral component interaction with the system 900. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the system 900. The output device circuitry may also include speakers or other audio emitting devices, printer(s), and/or the like. In some embodiments, the sensor circuitry 921 may be used as the input device circuitry (e.g., an image capture device, motion capture device, or the like) and one or more actuators 922 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 924 may be coupled to the system 900 to power the system 900, which may be used in embodiments where the system 900 is not in a fixed location, such as when the system 900 is a mobile or laptop client system. The battery 924 may be a lithium ion battery, a lead-acid automotive battery, or a metal-air battery, such as a zinc-air battery, an aluminum-air battery, a lithium-air battery, a lithium polymer battery, and/or the like. In embodiments where the system 900 is mounted in a fixed location, such as when the system is implemented as a server computer system, the system 900 may have a power supply coupled to an electrical grid. In these embodiments, the system 900 may include power tee circuitry to provide for electrical power drawn from a network cable to provide both power supply and data connectivity to the system 900 using a single cable.

Power management integrated circuitry (PMIC) 926 may be included in the system 900 to track the state of charge (SoCh) of the battery 924, and to control charging of the system 900. The PMIC 926 may be used to monitor other parameters of the battery 924 to provide failure predictions, such as the state of health (SoH) and the state of function (SoF) of the battery 924. The PMIC 926 may include voltage regulators, surge protectors, power alarm detection circuitry. The power alarm detection circuitry may detect one or more of brown out (under-voltage) and surge (over-voltage) conditions. The PMIC 926 may communicate the information on the battery 924 to the processor circuitry 902 over the IX 906. The PMIC 926 may also include an analog-to-digital (ADC) convertor that allows the processor circuitry 902 to directly monitor the voltage of the battery 924 or the current flow from the battery 924. The battery parameters may be used to determine actions that the system 900 may perform, such as transmission frequency, mesh network operation, sensing frequency, and the like.

A power block 928, or other power supply coupled to an electrical grid, may be coupled with the PMIC 926 to charge the battery 924. In some examples, the power block 928 may be replaced with a wireless power receiver to obtain the power wirelessly, for example, through a loop antenna in the system 900. In these implementations, a wireless battery charging circuit may be included in the PMIC 926. The specific charging circuits chosen depend on the size of the battery 924 and the current required.

The system 900 may include any combinations of the components shown by FIG. 9, however, some of the components shown may be omitted, additional components may be present, and different arrangement of the components shown may occur in other implementations. In one example where the system 900 is or is part of a server computer system, the battery 924, communication circuitry 909, the sensors 921, actuators 922, and/or POS 945, and possibly some or all of the I/O devices 956 may be omitted.

Figure 10:
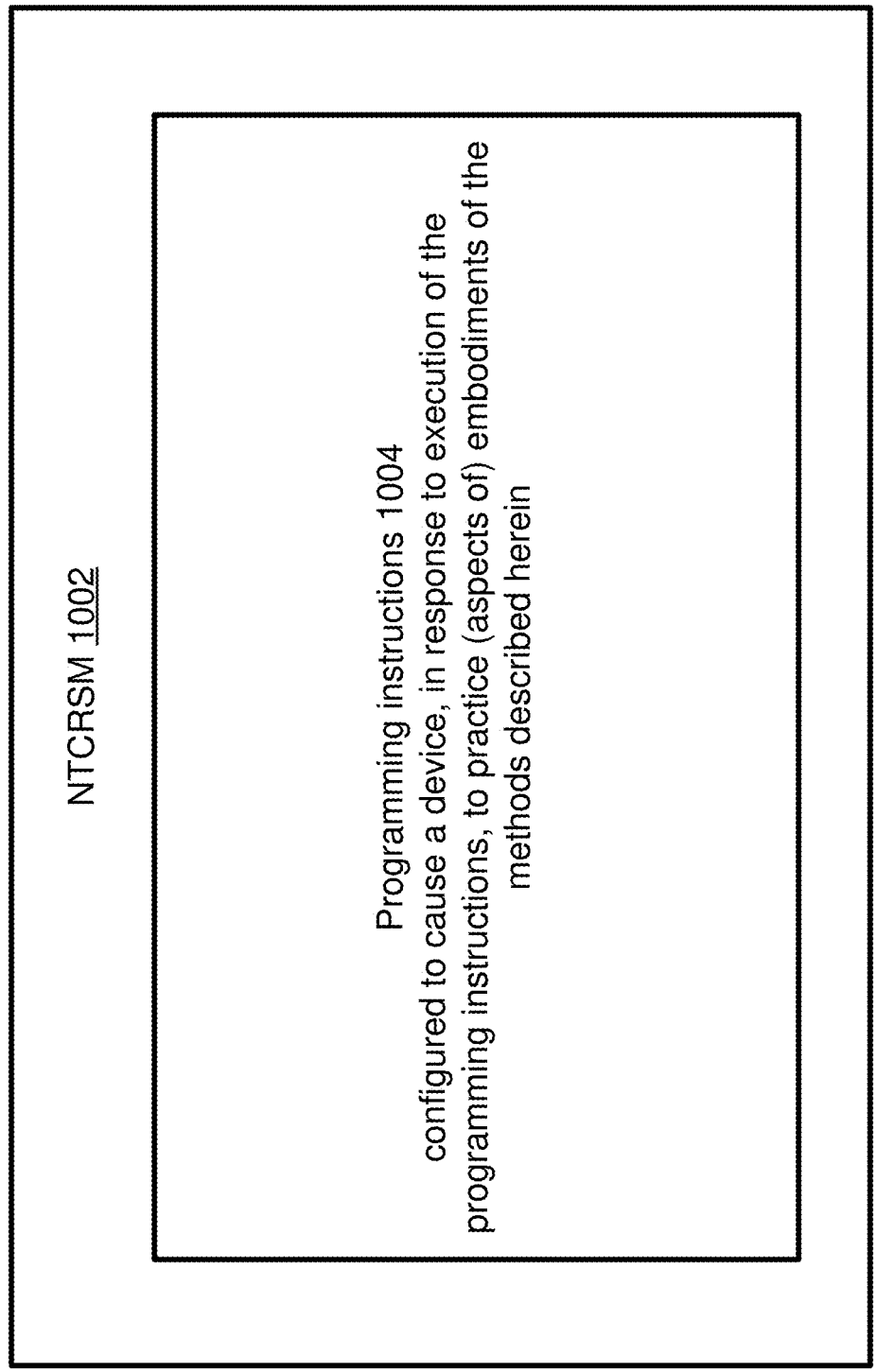
FIG. 10 illustrates an example non-transitory computer-readable storage media that may be suitable for use to store instructions (or data that creates the instructions) that cause an apparatus, in response to execution of the instructions by the apparatus, to practice selected aspects of the present disclosure.

Furthermore, the embodiments of the present disclosure may take the form of a computer program product or data to create the computer program, with the computer program or data embodied in any tangible or non-transitory medium of expression having the computer-usable program code (or data to create the computer program) embodied in the medium. FIG. 10 illustrates an example non-transitory computer-readable storage media (NTCRSM) that may be suitable for use to store instructions (or data that creates the instructions) that cause an apparatus (such as any of the devices/components/systems described with regard to FIGS. 1-9), in response to execution of the instructions by the apparatus, to practice selected aspects of the present disclosure. As shown, NTCRSM 1002 may include a number of programming instructions 1004 (or data to create the programming instructions). Programming instructions 1004 may be configured to enable a device (e.g., any of the devices/components/systems described with regard to FIGS. 1-9), in response to execution of the programming instructions 1004, to perform various programming operations associated with operating system functions, one or more applications, and/or aspects of the present disclosure (including various programming operations associated with FIGS. 1-8). In various embodiments, the programming instructions 1004 may correspond to any of the computational logic 980, instructions 982 and 984 discussed previously with regard to FIG. 9.

In alternate embodiments, programming instructions 1004 (or data to create the instructions 1004) may be disposed on multiple NTCRSM 1002. In alternate embodiments, programming instructions 1004 (or data to create the instructions 1004) may be disposed on computer-readable transitory storage media, such as, signals. The programming instructions 1004 embodied by a machine-readable medium may be r transmitted or received over a communications network using a transmission medium via a network interface device (e.g., communication circuitry 909 and/or NIC 916 of FIG. 9) utilizing any one of a number of transfer protocols (e.g., HTTP, etc.).

Any combination of one or more computer usable or computer readable media may be utilized as or instead of the NTCRSM 1002. The computer-usable or computer-readable medium may be, for example but not limited to, one or more electronic, magnetic, optical, electromagnetic, infrared, or semiconductor systems, apparatuses, devices, or propagation media. For instance, the NTCRSM 1002 may be embodied by devices described for the storage circuitry 908 and/or memory circuitry 904 described previously with regard to FIG. 9. More specific examples (a non-exhaustive list) of a computer-readable medium may include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. In the context of the present disclosure, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (e.g., including programming instructions 1004) or data to create the program code embodied therewith, either in baseband or as part of a carrier wave. The computer usable program code or data to create the program may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (e.g., programming instructions 1004) or data to create the program code as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an application programming interface (API), etc. in order to execute the instructions on a particular computing device or other device. In another example, the program code or data to create the program code may need to be configured (e.g., settings stored, data input, network addresses recorded, etc.) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including for example, programming instructions 1004, computational logic 980, instructions 982, and/or instructions 984, may be written in any combination of one or more programming languages, including an object oriented programming language such as Python, PyTorch, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), PHP, Pearl, Python, PyTorch, Ruby or Ruby on Rails, Lua, Torch/Lua with Just-In Time compiler (LuaJIT), Accelerated Mobile Pages Script (AMPscript), VBScript, and/or the like; a markup language such as HTML, XML, wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein. The computer program code for carrying out operations of the present disclosure may also be written in any combination of the programming languages discussed herein. The program code may execute entirely on the system 900, partly on the system 900 as a stand-alone software package, partly on the system 900 and partly on a remote computer (e.g., remote system 955), or entirely on the remote computer (e.g., remote system 955). In the latter scenario, the remote computer may be connected to the system 900 through any type of network (e.g., network 950).

5. EXAMPLES

Example A01 includes a computing system comprising: processor circuitry coupled with memory circuitry, wherein: the memory circuitry is arranged to store program code of a frame interpolation neural network (FINN), and the processor circuitry is arranged to operate the FINN to perform feature pyramid warping for video frame interpolation.

Example A02 includes the computing system of example A01 and/or some other examples herein, wherein the FINN comprises an optical flow estimator (OFE), a feature pyramid extractor (FPE), a forward warping engine (FWE), and a frame synthesis neural network (FSN).

Example A03 includes the computing system of example A02 and/or some other examples herein, wherein the OFE is arranged to explicitly perform motion estimation through an optical flow for the video frame interpolation.

Example A04 includes the computing system of example A03 and/or some other examples herein, wherein, to explicitly perform motion estimation, the OFE is arranged to determine correspondences between two input frames.

Example A05 includes the computing system of examples A02-A04 and/or some other examples herein, wherein the OFE is an Optical Flow with Convolutional Neural Network 2.0 (FlowNet2) and/or Pyramid, Warping, and Cost volume Neural network (PWC-Net).

Example A06 includes the computing system of examples A02-A05 and/or some other examples herein, wherein the FPE is arranged to extract one or more feature pyramids of at least two input frames.

Example A07 includes the computing system of example A06 and/or some other examples herein, wherein the FPE is arranged to perform principal component analysis on the feature space to generate a visualization of the one or more feature pyramids.

Example A08 includes the computing system of examples A06-A07 and/or some other examples herein, wherein the FPE is arranged to generate, as each of the one or more feature pyramids, a plurality of pyramid levels based on each input frame of the at least two input frames.

Example A09 includes the computing system of example A08 and/or some other examples herein, wherein, to generate the plurality of pyramid levels, the FPE is arranged to perform downsampling using a plurality of strided convolutions, wherein individual strided convolutions of the plurality of strided convolutions correspond to individual pyramid levels of the plurality of pyramid levels.

Example A10 includes the computing system of examples A08-A09 and/or some other examples herein, wherein, to generate the plurality of pyramid levels, the FPE is arranged to use Parametric Rectified Linear Units (PReLUs) as activation functions for respective ones of the plurality of strided convolutions.

Example A11 includes the computing system of examples A06-A10 and/or some other examples herein and/or some other examples herein, wherein the FWE is arranged to pre-warp the one or more feature pyramids together with the at least two input frames to a target temporal position according to the estimated optical flow output by the OFE.

Example A12 includes the computing system of example A11 and/or some other examples herein, wherein, to pre-warp the one or more feature pyramids together with the at least two input frames, the FWE is arranged to: pre-warp a feature pyramid of a first frame of the at least two input frames according to a forward flow scaled by the target temporal position (1), and pre-warp a feature pyramid of a feature pyramid of a second frame of the at least two input frames according to backward flow scaled by 1-t.

Example A13 includes the computing system of examples A11-A12 and/or some other examples herein, wherein the FWE is arranged to warp the one or more feature pyramids together with the at least two input frames to the target temporal position according to the estimated optical flow.

Example A14 includes the computing system of example A13 and/or some other examples herein, wherein the FWE is arranged to resize and rescale the optical flow to warp individual pyramid levels of the plurality of pyramid levels.

Example A15 includes the computing system of examples A12-A14 and/or some other examples herein, wherein the FSN is arranged to generate interpolation results based on the pre-warped input frames and feature pyramids.

Example A16 includes the computing system of example A15 and/or some other examples herein, wherein the FSN is arranged to: concatenate each pyramid level of the warped feature pyramids channel-wise; and inputs the concatenated pyramid levels to a grid network comprising a plurality of columns, wherein one or more columns of the plurality of columns perform downsampling and one or more other columns of the plurality of columns perform upsampling.

Example A17 includes the computing system of examples A01-A16 and/or some other examples herein, wherein the processor circuitry comprises: a plurality of processing cores, the plurality of processing cores including at least one neural processing unit (NPU), wherein the at least one NPU is arranged to operate program code of one or more of the OFE, the FPE, the FWE, and the FSN.

Example A18 includes the computing system of example A17 and/or some other examples herein, wherein one or more other processing cores of the plurality of processing cores not including the at least one NPU are arranged to operate the program code of the one or more of the OFE, the FPE, the FWE, and the FSN not operated by the at least one NPU.

Example A19 includes the computing system of examples A17-A18 and/or some other examples herein, wherein the at least one NPU and other processing cores of the plurality of processing cores are arranged to operate in parallel or operate in sequential order.

Example A20 includes the computing system of examples A17-A19 and/or some other examples herein, wherein training data or training datasets are employed to optimize the operations of the at least one NPU.

Example A21 includes the computing system of examples A01-A16 and/or some other examples herein, wherein the processor circuitry comprises: a plurality of hardware accelerators, wherein the plurality of hardware accelerators include one or more hardware accelerators configured to operate a corresponding one of the OFE, the FPE, the FWE, and the FSN.

Example A22 includes the computing system of example A21 and/or some other examples herein, wherein the processor circuitry further comprises: a plurality of processing cores of a host platform that is communicatively coupled with the plurality of hardware accelerators, and the plurality of processing cores are arranged to initialize operation of the FINN by the one or more hardware accelerators and/or offload one or more tasks to the one or more hardware accelerators.

Example A23 includes the computing system of examples A21-A22 and/or some other examples herein, wherein the plurality of processing cores and the plurality of hardware accelerators are arranged to operate in parallel or operate in sequential order.

Example A24 includes the computing system of examples A21-A23 and/or some other examples herein, wherein training data or training datasets are employed to optimize the operations of respective ones of the plurality of hardware accelerators.

Example A25 includes the computing system of examples A21-A24 and/or some other examples herein, wherein the plurality of hardware accelerators comprise one or more digital signal processors (DSPs), programmable logic devices (PLDs), field-programmable gate arrays (FPGAs), Application Specific Integrated Circuits (ASICs), and/or programmable System-on-Chips (SoCs).

Example B01 includes a frame interpolation neural network (FINN) to perform feature pyramid warping for video frame interpolation, the FINN comprising: optical flow estimation (OFE) means for explicitly performing motion estimation on at least two input frames through an optical flow for the video frame interpolation; a feature pyramid extraction (FPE) means for extracting one or more feature pyramids of the at least two input frames; a forward warping (FW) means for pre-warping the one or more feature pyramids together with the at least two input frames to a target temporal position according to the estimated optical flow output by the OFE means; and a frame synthesis neural network (FSN) means for generating interpolation results based on the pre-warped input frames and feature pyramids.

Example B02 includes the FINN of example B01 and/or some other examples herein, wherein, to explicitly perform motion estimation, the OFE means is for determining correspondences between the at least two input frames.

Example B03 includes the FINN of examples B01-B02 and/or some other examples herein, wherein the FPE means is for performing principal component analysis on the feature space to generate a visualization of the one or more feature pyramids.

Example B04 includes the FINN of examples B01-B03 and/or some other examples herein, wherein the FPE means is for generating, as each of the one or more feature pyramids, a plurality of pyramid levels based on each input frame of the at least two input frames.

Example B05 includes the FINN of example B04 and/or some other examples herein, wherein, to generate the plurality of pyramid levels, the FPE means is for performing downsampling using a plurality of strided convolutions, wherein individual strided convolutions of the plurality of strided convolutions correspond to individual pyramid levels of the plurality of pyramid levels.

Example B06 includes the FINN of example B05 and/or some other examples herein, wherein, to generate the plurality of pyramid levels, the FPE means is for using Parametric Rectified Linear Units (PReLUs) as activation functions for respective ones of the plurality of strided convolutions.

Example B07 includes the FINN of examples B01-B06 and/or some other examples herein, wherein, to pre-warp the one or more feature pyramids together with the at least two input frames, the FW means is for: pre-warping a feature pyramid of a first frame of the at least two input frames according to a forward flow scaled by the target temporal position (1); and pre-warping a feature pyramid of a feature pyramid of a second frame of the at least two input frames according to backward flow scaled by 1-t.

Example B08 includes the FINN of example B07 and/or some other examples herein, wherein the FW means is for warping the one or more feature pyramids together with the at least two input frames to the target temporal position according to the estimated optical flow.

Example B09 includes the FINN of example B08 and/or some other examples herein, wherein the FW means is for resizing and rescaling the optical flow to warp individual pyramid levels of the plurality of pyramid levels.

Example B10 includes the FINN of examples B01-B09 and/or some other examples herein, wherein the FSN means is for: concatenating each pyramid level of the warped feature pyramids channel-wise; and inputting the concatenated pyramid levels to a grid network comprising a plurality of columns and/or some other examples herein, wherein one or more columns of the plurality of columns perform downsampling and one or more other columns of the plurality of columns perform upsampling.

Example D01 includes an integrated circuit (IC) comprising: a plurality of processing cores, wherein at least one processing core of the plurality of processing cores includes a neural processing unit (NPU), and wherein the NPU is arranged to operate a frame interpolation neural network (FINN) to perform feature pyramid warping for video frame interpolation.

Example D02 includes the IC of example D01 and/or some other examples herein, wherein the FINN comprises an optical flow estimator (OFE), a feature pyramid extractor (FPE), a forward warping engine (FWE), and a frame synthesis neural network (FSN), and the NPU is arranged to operate program code of one or more of the OFE, the FPE, the FWE, and the FSN. Example D03 includes the IC of example D02 and/or some other examples herein, wherein the OFE is arranged to explicitly perform motion estimation through an optical flow for the video frame interpolation. Example D04 includes the IC of example D03 and/or some other examples herein, wherein, to explicitly perform motion estimation, the OFE is arranged to determine correspondences between two input frames. Example D05 includes the IC of examples D02-D04 and/or some other examples herein, wherein the OFE is an Optical Flow with Convolutional Neural Network 2.0 (FlowNet2) and/or Pyramid, Warping, and Cost volume Neural network (PWC-Net). Example D06 includes the IC of examples D02-D05 and/or some other examples herein, wherein the FPE is arranged to extract one or more feature pyramids of at least two input frames. Example D07 includes the IC of example D06 and/or some other examples herein, wherein the FPE is arranged to perform principal component analysis on the feature space to generate a visualization of the one or more feature pyramids. Example D08 includes the IC of examples D06-D07 and/or some other examples herein, wherein the FPE is arranged to generate, as each of the one or more feature pyramids, a plurality of pyramid levels based on each input frame of the at least two input frames. Example D09 includes the IC of example D08 and/or some other examples herein, wherein, to generate the plurality of pyramid levels, the FPE is arranged to perform downsampling using a plurality of strided convolutions, wherein individual strided convolutions of the plurality of strided convolutions correspond to individual pyramid levels of the plurality of pyramid levels. Example D10 includes the IC of examples D08-D09 and/or some other examples herein, wherein, to generate the plurality of pyramid levels, the FPE is arranged to use Parametric Rectified Linear Units (PReLUs) as activation functions for respective ones of the plurality of strided convolutions. Example D11 includes the IC of examples D06-D10 and/or some other examples herein, wherein the FWE is arranged to pre-warp the one or more feature pyramids together with the at least two input frames to a target temporal position according to the estimated optical flow output by the OFE.

Example D12 includes the IC of example D11 and/or some other examples herein, wherein, to pre-warp the one or more feature pyramids together with the at least two input frames, the FWE is arranged to: pre-warp a feature pyramid of a first frame of the at least two input frames according to a forward flow scaled by the target temporal position (1), and pre-warp a feature pyramid of a feature pyramid of a second frame of the at least two input frames according to backward flow scaled by 1-1.

Example D13 includes the IC of examples D11-D12 and/or some other examples herein, wherein the FWE is arranged to warp the one or more feature pyramids together with the at least two input frames to the target temporal position according to the estimated optical flow. Example D14 includes the IC of example D13 and/or some other examples herein, wherein the FWE is arranged to resize and rescale the optical flow to warp individual pyramid levels of the plurality of pyramid levels. Example D15 includes the IC of examples D12-D14 and/or some other examples herein, wherein the FSN is arranged to generate interpolation results based on the pre-warped input frames and feature pyramids. Example D16 includes the IC of example D15 and/or some other examples herein, wherein the FSN is arranged to: concatenate each pyramid level of the warped feature pyramids channel-wise; and inputs the concatenated pyramid levels to a grid network comprising a plurality of columns, wherein one or more columns of the plurality of columns perform downsampling and one or more other columns of the plurality of columns perform upsampling. Example D17 includes the IC of examples DO1-D16 and/or some other examples herein, wherein one or more other processing cores of the plurality of processing cores not including the at least one NPU are arranged to operate the program code of the one or more of the OFE, the FPE, the FWE, and the FSN not operated by the at least one NPU.

Example D18 includes the IC of examples DO1-D17 and/or some other examples herein, wherein the at least one NPU and other processing cores of the plurality of processing cores are arranged to operate in parallel or operate in sequential order.

Example D19 includes the IC of examples D01-D18 and/or some other examples herein, wherein training data or training datasets are employed to optimize the operations of the at least one NPU.

Example D20 includes the IC of examples D01-D019 and/or some other examples herein, wherein the IC is a System-on-Chip (SoC) further comprising memory circuitry arranged to store program code of the FINN.

Example E01 includes a semiconductor device configured to operate a frame interpolation neural network (FINN) to perform feature pyramid warping for video frame interpolation.

Example E02 includes the semiconductor device of example E01 and/or some other examples herein, wherein the FINN comprises an optical flow estimator (OFE), a feature pyramid extractor (FPE), a forward warping engine (FWE), and a frame synthesis neural network (FSN).

Example E03 includes the semiconductor device of example E02 and/or some other examples herein, wherein the semiconductor device is configured to operate the OFE to explicitly perform motion estimation through an optical flow for the video frame interpolation.

Example E04 includes the semiconductor device of example E03 and/or some other examples herein, wherein, to explicitly perform motion estimation, the semiconductor device is configured to operate the OFE to determine correspondences between two input frames.

Example E05 includes the semiconductor device of examples E02-E04 and/or some other examples herein, wherein the OFE is an Optical Flow with Convolutional Neural Network 2.0 (FlowNet2) and/or Pyramid, Warping, and Cost volume Neural network (PWC-Net).

Example E06 includes the semiconductor device of examples E02-E05 and/or some other examples herein, wherein the semiconductor device is configured to operate the FPE to extract one or more feature pyramids of at least two input frames.

Example E07 includes the semiconductor device of example E06 and/or some other examples herein, wherein the semiconductor device is configured to operate the FPE to perform principal component analysis on the feature space to generate a visualization of the one or more feature pyramids.

Example E08 includes the semiconductor device of examples E06-E07 and/or some other examples herein, wherein the semiconductor device is configured to operate the FPE to generate, as each of the one or more feature pyramids, a plurality of pyramid levels based on each input frame of the at least two input frames.

Example E09 includes the semiconductor device of example E08 and/or some other examples herein, wherein, to generate the plurality of pyramid levels, the semiconductor device is configured to operate the FPE to perform downsampling using a plurality of strided convolutions and/or some other examples herein, wherein individual strided convolutions of the plurality of strided convolutions correspond to individual pyramid levels of the plurality of pyramid levels.

Example E10 includes the semiconductor device of examples E08-E09 and/or some other examples herein, wherein, to generate the plurality of pyramid levels, the semiconductor device is configured to operate the FPE to use Parametric Rectified Linear Units (PReLUs) as activation functions for respective ones of the plurality of strided convolutions.

Example E11 includes the semiconductor device of examples E06-E10 and/or some other examples herein, wherein the semiconductor device is configured to operate the FWE to pre-warp the one or more feature pyramids together with the at least two input frames to a target temporal position according to the estimated optical flow output by the OFE.

Example E12 includes the semiconductor device of example E11 and/or some other examples herein, wherein, to pre-warp the one or more feature pyramids together with the at least two input frames, the semiconductor device is configured to operate the FWE to: pre-warp a feature pyramid of a first frame of the at least two input frames according to a forward flow scaled by the target temporal position (1), and pre-warp a feature pyramid of a feature pyramid of a second frame of the at least two input frames according to backward flow scaled by 1-1.

Example E13 includes the semiconductor device of examples E11-E12 and/or some other examples herein, wherein the semiconductor device is configured to operate the FWE to warp the one or more feature pyramids together with the at least two input frames to the target temporal position according to the estimated optical flow.

Example E14 includes the semiconductor device of example E13 and/or some other examples herein, wherein the semiconductor device is configured to operate the FWE to resize and rescale the optical flow to warp individual pyramid levels of the plurality of pyramid levels.

Example E15 includes the semiconductor device of examples E12-E14 and/or some other examples herein, wherein the semiconductor device is configured to operate the FSN to generate interpolation results based on the pre-warped input frames and feature pyramids.

Example E16 includes the semiconductor device of example E15 and/or some other examples herein, wherein the semiconductor device is configured to operate the FSN to: concatenate each pyramid level of the warped feature pyramids channel-wise; and inputs the concatenated pyramid levels to a grid network comprising a plurality of columns, wherein one or more columns of the plurality of columns perform downsampling and one or more other columns of the plurality of columns perform upsampling.

Example E17 includes the computing system of examples E01-E16 and/or some other examples herein, wherein training data or training datasets are employed to optimize the operations of the semiconductor device.

Example E18 includes the semiconductor device of examples E01-E17 and/or some other examples herein, wherein the semiconductor device comprises one or more hardware accelerators.

Example E19 includes the computing system of example E18 and/or some other examples herein, wherein the one or more hardware accelerators comprise one or more digital signal processors (DSPs), programmable logic devices (PLDs), field-programmable gate arrays (FPGAs), Application Specific Integrated Circuits (ASICs), and/or programmable System-on-Chips (SoCs).

Example E20 includes the semiconductor device of examples E01-E17 and/or some other examples herein, wherein the semiconductor device comprises one or more custom-designed artificial intelligence silicon processor cores.

Example F01 includes an integrated circuit (IC) package configured to operate a frame interpolation neural network (FINN), the IC comprising: optical flow estimation (OFE) circuitry configured to estimate a forward optical flow and a backward optical flow from a first input frame and a second input frame of a video, the forward optical flow indicating how pixels in the first input frame are to be changed to produce the second input frame during a time period starting from the first input frame and ending at the second input frame, and the backward optical flow indicating how pixels in the second input frame are to be changed to produce the first input frame during a time period starting from the first input frame and ending at the second input frame; feature pyramid extraction (FPE) circuitry configured to extract a first feature pyramid from the first input frame and a second feature pyramid from the second input frame, the first feature pyramid including a first set of features extracted from the first input frame at each resolution of a plurality of resolutions, and the second feature pyramid including a second set of features extracted from the second input frame at each resolution of the plurality of resolutions; and frame synthesis neural network (FSN) circuitry configured to apply the first and second feature pyramids to the first and second input frames, respectively, to generate an output frame at a temporal position between the first and second input frames based on the forward and backward optical flows.

Example F02 includes the IC package of example F01 and/or one or more other example(s) herein, wherein the FPE circuitry is further configured to apply a same configuration to the first and second input frames to extract the first and second feature pyramids, respectively.

Example F03 includes the IC package of examples F01-F02 and/or one or more other example(s) herein, wherein at least some features in the first set of features and at least some features in the second set of features are based on a color space of the first and second input frames.

Example F04 includes the IC package of examples F01-F03 and/or one or more other example(s) herein, wherein the output frame includes pixels of the first and the second input frames shifted from the first and second input frames, respectively, to replicate motion to take place from the first input frame to the target temporal location and from the target temporal location to the second input frame.

Example F05 includes the IC package of examples F01-F04 and/or one or more other example(s) herein, wherein the FPE circuitry is further configured to: generate the first and second input frames at each of the plurality of resolutions based on features extracted from the first and second input frames.

Example F06 includes the IC package of examples F01-F05 and/or one or more other example(s) herein, wherein, to extract the first and second feature pyramids, the FPE circuitry is further configured to: read a number of input features from the first and second input frames at each resolution; and produce a number of output features from the number of input features for each of the first and second input frames.

Example F07 includes the IC package of example F06 and/or one or more other example(s) herein, wherein the FPE circuitry comprises: convolutional circuitry interleaved with activation function circuitry and configured to convolve one or both of the first and second input frames at each resolution to extract the set of features from the first and second input frames at each resolution of the plurality of resolutions.

Example F08 includes the IC package of examples F01-F07 and/or one or more other example(s) herein, further comprising forward warping (FW) circuitry configured to: warp the first feature pyramid toward the second feature pyramid using the forward optical flow; and warp the second feature pyramid toward the first feature pyramid using the backward optical flow.

Example F09 includes the IC package of example F08 and/or one or more other example(s) herein, wherein, to generate the output frame, the FSN circuitry is configured to: predict an interpolation result from the warped feature pyramids and warped versions of the first and second input frames.

Example F10 includes the IC package of example F09 and/or one or more other example(s) herein, wherein the FPE circuitry is further configured to: use the predicted interpolation result to extract new feature pyramids from respective input frames, the new feature pyramids including a set of features different than the features of the first and second feature pyramids.

Example F11 includes the IC package of examples F09-F10 and/or one or more other example(s) herein, wherein the FSN circuitry comprises a grid of processing blocks, wherein each row in the grid of processing blocks corresponds to a resolution of the set of resolutions. Example F12 includes the IC package of example F11 and/or one or more other example(s) herein, wherein and a first processing block in each row is configured to receive a warped set of features at the corresponding resolution in the first and second feature pyramids.

Example F13 includes the IC package of examples F01-F12 and/or one or more other example(s) herein, wherein the extracted first and second feature pyramids are based on a color space of the first and second input frames.

Example F14 includes the IC package of examples F01-F13 and/or one or more other example(s) herein, wherein the FPE circuitry is further configured to: generate the first and second input frames at each of the plurality of resolutions based on features extracted from the first and second input frames at a next lowest resolution or based on features extracted from the first and second input frames at a next highest resolution.

Example F15 includes the IC package of examples F01-F14 and/or one or more other example(s) herein, wherein, to extract the first and second feature pyramids, the FPE circuitry is further configured to: read a number of input features from the first and second input frames at each resolution, respectively; and produce a number of output features the number of input features.

Example F16 includes the IC package of examples F01-F15 and/or one or more other example(s) herein, wherein, to extract the first and second feature pyramids, the FPE circuitry is further configured to: read a number of input features from an input frame, like its color; and produce a number of output features the number of input features at multiple resolutions.

Example F17 includes the IC package of examples F01-F16 and/or one or more other example(s) herein, wherein the OFE circuitry, the FPE circuitry, the FSN circuitry, and the FW circuitry are coupled to one another via an interconnect technology, and implemented as: respective dies of a System-in-Package (SiP) or Multi-Chip Package (MCP); respective execution units or processor cores of a general purpose processor; or respective digital signal processors (DSPs), field-programmable gate arrays (FPGAs), Application Specific Integrated Circuits (ASICs), programmable logic devices (PLDs), System-on-Chips (SoCs), Graphics Processing Units (GPUs), SiPs, MCPs, or any combination of DSPs, FPGAs, ASICs, PLDs, SoCs, GPUs, SiPs, and MCPs.

Example G01 includes one or more computer-readable media (CRM) comprising instructions of a frame interpolation neural network (FINN), wherein execution of the instructions by one or more processors is to cause the one or more processors to: obtain a first input frame and a second input frame of a video; estimate a forward optical flow and a backward optical flow from the first and second input frames, the forward optical flow indicating how pixels in the first input frame are to be changed to produce the second input frame during a time period starting from the first input frame and ending at the second input frame, and the backward optical flow indicating how pixels in the second input frame are to be changed to produce the first input frame during a time period starting from the first input frame and ending at the second input frame; extract a first feature pyramid from the first input frame and a second feature pyramid from the second input frame, the first feature pyramid including a first set of features extracted from the first input frame at each resolution of a plurality of resolutions, and the second feature pyramid including a second set of features extracted from the second input frame at each resolution of the plurality of resolutions; warp the first feature pyramid toward the second feature pyramid using the forward optical flow; warp the second feature pyramid toward the first feature pyramid using the backward optical flow; and generate an output frame at a temporal position between the first and second input frames based on the warped first and second feature pyramids.

Example G02 includes the CRM of example G01 and/or one or more other example(s) herein, wherein the first and second sets of features are based on a color space of the first and second input frames, respectively.

Example G03 includes the CRM of examples G01-G02 and/or one or more other example(s) herein, wherein execution of the instructions is to further cause the one or more processors to: read a number of input features from the first and second input frames at each resolution; and generate a number of output features from the number of input features at each resolution, wherein the output features at each resolution represent different octaves of the input features and vary in number.

Example G04 includes the CRM of example G03 and/or one or more other example(s) herein, wherein the FINN comprises a plurality of convolutional functions interleaved with a plurality of activation functions, and execution of the instructions is to cause the one or more processors to: operate the convolutional functions to convolve the first and second input frames at each resolution; and operate the activation functions to extract individual features from the convolved first and second input frames.

Example G05 includes the CRM of examples G01-G04 and/or one or more other example(s) herein, wherein, to generate the output frame, execution of the instructions is to cause the one or more processors to: predict an interpolation result from the warped feature pyramids and warped versions of the first and second input frames.

Example G06 includes the CRM of examples G01-G05 and/or one or more other example(s) herein, wherein the FINN includes a frame synthesis neural network comprising a grid of processing blocks, wherein each row in the grid of processing blocks corresponds to a resolution of the plurality of resolutions, and execution of the instructions is to cause the one or more processors to: concatenate the warped first and second feature pyramids such the concatenated feature pyramid includes features extracted from the first and second input frames at each resolution; and input the features extracted from the first and second input frames at each resolution to respective input processing blocks of each row.

Example H01 includes a computing system comprising: processor circuitry coupled with memory circuitry, the memory circuitry arranged to store program code of a frame interpolation neural network (FINN), the FINN comprising an optical flow estimator (OFE), a feature pyramid extractor (FPE), a forward warping engine (FWE), and a frame synthesis neural network (FSN), and the processor circuitry is arranged to operate the OFE to estimate a forward optical flow and a backward optical flow from first and second input frames of a video to be interpolated, the forward optical flow indicating how pixels in the first input frame are to be changed to produce the second input frame during a time period starting from the first input frame and ending at the second input frame, and the backward optical flow indicating how pixels in the second input frame are to be changed to produce the first input frame during a time period starting from the first input frame and ending at the second input frame; the processor circuitry is arranged to operate the FPE to extract a first feature pyramid from the first input frame and a second feature pyramid from the second input frame, the first feature pyramid including a first set of features extracted from the first input frame at each resolution of a plurality of resolutions, and the second feature pyramid including a second set of features extracted from the second input frame at each resolution of the plurality of resolutions; the processor circuitry is arranged to operate the FWE to warp the first feature pyramid toward the second feature pyramid using the forward optical flow, and warp the second feature pyramid toward the first feature pyramid using the backward optical flow; the processor circuitry is arranged to operate the FSN to generate an output frame at a desired temporal position between the first and second input frames based on the warped first and second feature pyramids, wherein the output frame includes pixels of the first and the second input frames shifted from the first and second input frames, respectively, to replicate motion to take place from the first input frame to the target temporal location and from the target temporal location to the second input frame.

Example H02 includes the computing system of example H01 and/or one or more other example(s) herein, wherein the processor circuitry is further arranged to operate the FPE to: read a number of input features from one or both of the first and second input frames at each resolution; and generate a number of output features from the number of input features at each resolution, wherein the output features at each resolution represent different octaves of the input features and vary in number.

Example H03 includes the computing system of examples H01-H02 and/or one or more other example(s) herein, wherein the FPE comprises a plurality of convolutional functions interleaved with a plurality of activation functions, and the processor circuitry is further arranged to operate the FPE to: operate the convolutional functions to convolve the first and second input frames at each resolution; and operate the activation functions to extract individual features from the convolved first and second input frames.

Example H04 includes the computing system of examples H01-H03 and/or one or more other example(s) herein, wherein, to generate the output frame, the processor circuitry is further arranged to operate the FSN to: predict an interpolation result from the warped feature pyramids and warped versions of the first and second input frames.

Example H05 includes the computing system of example H04 and/or one or more other example(s) herein, wherein the FSN comprises a grid of processing blocks, wherein each row in the grid of processing blocks corresponds to a resolution of the set of resolutions.

Example H06 includes the computing system of examples H01-H05 and/or one or more other example(s) herein, wherein the computing system is a System-in-Package (SiP), Multi-Chip Package (MCP), a System-on-Chips (SoC), a digital signal processors (DSP), a field-programmable gate arrays (FPGA), an Application Specific Integrated Circuits (ASIC), a programmable logic devices (PLD), a Central Processing Unit (CPU), a Graphics Processing Unit (GPU), or the computing system comprises two or more of SiPs, MCPs, SoCs, DSPs, FPGAs, ASICS, PLDs, CPUs, GPUs interconnected with one another.

Example X01 includes one or more CRM comprising instructions for performing video interpolation, wherein execution of the instructions by one or more processors of a computing system is to cause the computing system to: obtain a first input frame and a second input frame of a video at a first resolution; estimate a forward optical flow from the first input frame to the second input frame, the forward optical flow indicating how pixels in the first input frame change to produce the second input frame during a time period starting from the first input frame and ending at the second input frame; estimate a backward optical flow from the second input frame to the first input frame, the backward optical flow indicating how pixels in the second input frame change to produce the first input frame during a time period starting from the first input frame and ending at the second input frame; warp the first input frame towards the second input frame using the forward optical flow; warp the second input frame towards the first input frame using the backward optical flow; and extract a set of features from the first and second input frames at multiple resolutions different than the first resolution. Example X01 may be combined with any one or more of the preceding examples, and/or other embodiments herein.

Example Z01 may include an apparatus comprising means to perform one or more elements of a method described in or related to any of examples A01-X01, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-X01, or any other method or process described herein. Example Z03 may include an apparatus comprising logic, modules, or circuitry to perform one or more elements of a method described in or related to any of examples A01-X01, or any other method or process described herein. Example Z04 may include a method, technique, or process as described in or related to any of examples A01-X01, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-X01, or portions thereof. Example Z06 may include a signal as described in or related to any of examples A01-X01, or portions or parts thereof. Example Z07 may include a datagram, packet, frame, segment, protocol data unit (PDU), or message as described in or related to any of examples A01-X01, or portions or parts thereof, or otherwise described in the present disclosure. Example Z08 may include a signal encoded with data as described in or related to any of examples A01-X01, or portions or parts thereof, or otherwise described in the present disclosure.

Example Z09 may include a signal encoded with a datagram, packet, frame, segment, protocol data unit (PDU), or message as described in or related to any of examples A01-X01, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-X01, or portions thereof. Example Z11 may include a computer program comprising instructions, wherein execution of the program by a processing element is to cause the processing element to carry out the method, techniques, or process as described in or related to any of examples A01-X01, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group) that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. As used herein, the term "module" may refer to one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like. As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, webpages, web applications, and/or the like. The term "network resource" may refer to a resource hosted by a remote entity and accessible over a network. The term "document" may refer to a computer file or resource used to record data, and includes various file types or formats such as word processing, spreadsheet, slide presentation, multimedia items, and the like.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. Additionally, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network. The term "computer system" may include any type of electronic devices, such as a cellular phone or smart phone, tablet personal computer, wearable computing device, an autonomous sensor, laptop computer, desktop personal computer, a video game console, a digital media player, a handheld messaging device, a personal data assistant, an electronic book reader, an augmented reality device, server computer device(s) (e.g., stand-alone, rack-mounted, blade, etc.), and/or any other like electronic device.

The term "server" as used herein refers to a computing device or system, including processing hardware and/or process space(s), an associated storage medium such as a memory device or database, and, in some instances, suitable application(s) as is known in the art. The terms "server system" and "server" may be used interchangeably herein, that provides access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

6. REFERENCES

[R01] Bailer et al., "Flow Fields: Dense correspondence fields for highly accurate large displacement optical flow estimation", IEEE International Conference on Computer Vision (ICCV), pp. 4015-4023 (December 2015). [R02]

Baker et al., "A database and evaluation methodology for optical flow", Int'l J. of Computer Vision, vol. 92, no. 1, pp. 1-31, (30 Nov. 2010).

[R03] Bojanowski et al. "Optimizing the latent space of generative networks", arXiv/1707.05776, (18 Jul. 2017).

[R04] Brox et al., "Large displacement optical flow", IEEE Conference on Computer Vision and Pattern Recognition ", pp. 41-48 (20 Jun. 2009).

[R05] Brox et al., "Large displacement optical flow: Descriptor matching in variational motion estimation", IEEE Transactions on Pattern Analysis and Machine Intelligence, vol. 33, no. 3, pp. 500-513 (2011).

[R06] Butler et al., "A naturalistic open source movie for optical flow evaluation", European Conference on Computer Vision, Springer, Berlin, Heidelberg, pp. 611-625 (7 Oct. 2012).

[R07] Dosovitskiy et al., "FlowNet: Learning optical flow with convolutional networks", IEEE International Conference on Computer Vision, pp. 2758-2766 (2015).

[R08] Erhan et al., "Visualizing higher-layer features of a deep network", Univ. of Montreal, vol. 1341, no. 3, p. 1 (9 Jun. 2009).

[R09] Flynn et al., "Deep-Stereo: Learning to predict new views from the world's imagery", IEEE Conference on Computer Vision and Pattern Recognition, pp. 5515-5524 (2016).

[R10] Fourure et al., "Residual Conv-Deconv Grid Network for Semantic Segmentation", arXiv: 1707.07958v2 (25 Jul. 2017), British Machine Vision Conference (4 Sep. 2017). [R11] Goodfellow et al., "Generative adversarial nets", Advances in Neural Information Processing Systems, vol. 27, pp. 2672-2680 (2014).

[R12] He et al., "Delving deep into rectifiers: Surpassing human-level performance on ImageNet classification", IEEE International Conference on Computer Vision, pp. 1026-1034 (2015). [R13] Herbst et al., "Occlusion reasoning for temporal interpolation using optical flow", Dept. of Comp. Sci. and Eng., Univ. of Washington, Tech. Rep. UW-CSE-09-08-01 (August 2009). [R14] Horn et al., "Determining optical flow", Artificial Intelligence, vol. 17 (1-3), pp. 185-203 (1981).

[R15] Hu et al., "Efficient coarse-to-fine patch match for large displacement optical flow", IEEE Conference on Computer Vision and Pattern Recognition, pp. 5704-5712 (2016). [R16] Hui et al., "LiteFlowNet: A lightweight convolutional neural network for optical flow estimation", IEEE Conference on Computer Vision and Pattern Recognition, pp. 8981-8989 (June 2018).

[R17] µg et al., "Flownet 2.0: Evolution of optical flow estimation with deep networks", IEEE Conference on Computer Vision and Pattern Recognition, pp. 1647-1655 (2017). [R18] Jaderberg et al., "Spatial transformer networks", Advances in Neural Information Processing Systems, pp. 2017-2025 (2015). [R19] Janai et al. "Slow flow: Exploiting high-speed cameras for accurate and diverse optical flow reference data", IEEE Conference on Computer Vision and Pattern Recognition, pp. 3597-3607 (July 2017).

[R20] Jiang et al., "Super SloMo: High quality estimation of multiple intermediate frames for video interpolation", IEEE Conference on Computer Vision and Pattern Recognition, pp. 3597-3607 (June 2018).

[R21] Johnson et al., "Perceptual losses for real-time style transfer and super-resolution", European Conference on Computer Vision, Springer, Cham., pp. 694-711 (8 Oct. 2016). [R22] Kalantari et al., "Learningbased view synthesis for light field cameras", ACM Trans. Graph., vol. 35, no. 6, pp. 193:1-193:10 (11 Nov. 2016).

[R23] Kartašev et al., "Implementing adaptive separable convolution for video frame interpolation", arXiv preprint arXiv: 1809.07759 (20 Sep. 2018).

[R24] Kingma et al., "A method for stochastic optimization", arXiv preprint arXiv: 1412.6980, (22 Dec. 2014).

[R25] Krizhevsky et al., "ImageNet classification with deep convolutional neural networks", Advances in Neural Information Processing Systems, 25, pp. 1106-1114, 2012.

[R26] Kuroki et al., "A psychophysical study of improvements in motion-image quality by using high frame rates", J. of the Society for Info. Display, vol. 15, no. 1, pp. 61-68 (January 2007). [R27] Kuroki et al., "Effects of motion image stimuli with normal and high frame rates on eeg power spectra: comparison with continuous motion image stimuli", J. of the Society for Info. Display, vol. 22, no. 4, pp. 191-198 (April 2014).

[R28] Lai et al., "Learning blind video temporal consistency", European Conference on Computer Vision (ECCV), pp. 179-195 (2018).

[R29] Ledig et al., "Photo-realistic single image super-resolution using a generative adversarial network", arXiv/ 1609.04802, version 1 (15 Sep. 2016), version 5 (25 May 2017). Ledig et al., "Photo-realistic single image super-resolution using a generative adversarial network", Proceedings of the IEEE conference on computer vision and pattern recognition, pp. 4681-4690 (2017).

[R30] Liu et al., "Video Frame Synthesis Using Deep Voxel Flow", IEEE International Conference on Computer Vision (ICCV), pp. 4463-4471 (October 2017).

[R31] Meyer et al., "Deep video color propagation", British Machine Vision Conference 2018, p. 128 (4 Sep. 2018). [R32] Meyer et al., "Phasenet for Video Frame Interpolation", IEEE Conference on Computer Vision and Pattern Recognition, (June 2018). [R33] Meyer et al., "Phase-based Frame Interpolation for Video", IEEE Conference on Computer Vision and Pattern Recognition, pp. 1410-1418 (2015). [R34] Niklaus et al., "Context-Aware Synthesis for Video Frame Interpolation", IEEE Conference on Computer Vision and Pattern Recognition, pp. 1701-1710 (June 2018).

[R35] Niklaus et al., "Video frame interpolation via adaptive convolution", IEEE Conference on Computer Vision and Pattern Recognition, pp. 670-679 (July 2017).

[R36] Niklaus et al., "Video frame interpolation via adaptive separable convolution", IEEE International Conference on Computer Vision, pp. 261-270 (October 2017). [R37] Odena et al., "Deconvolution and checkerboard artifacts", Distill, vol. 1, no. 10, p. e3 (17 Oct. 2016) (available on the internet at: http://distill.pub/2016/deconv-checkerboard). [R38] Raket et al., "Motion compensated frame interpolation with a symmetric optical flow constraint", Advances in Visual Computing, vol. 7431, pp. 447-457 (2012). Rakêt et al., "Motion compensated frame interpolation with a symmetric optical flow constraint", Int'l Symposium on Visual Computing, Springer, Berlin, Heidelberg, pp. 447-457 (2012).

[R39] Ranjan et al., "Optical flow estimation using a spatial pyramid network", IEEE Conference on Computer Vision and Pattern Recognition, pp. 2720-2729 (2017).

[R40] Sajjadi et al., "EnhanceNet: Single image super-resolution through automated texture synthesis", arXiv/ 1612.07919 (2016).

[R41] Simonyan et al., "Very deep convolutional networks for large-scale image recognition", arXiv preprint arXiv: 1409.1556 (2014).

[R42] Soomro et al., "UCF101: A dataset of 101 human actions classes from videos in the wild", arXiv preprint arXiv: 1212.0402 (3 Dec. 2012).

[R43] Sun et al., "A quantitative analysis of current practices in optical flow estimation and the principles behind them", Int'l J. of Computer Vision, vol. 106, no. 2, pp. 115-137 (3 Sep. 2013).

[R44] Sun et al., "PWC-Net: CNNs for optical flow using pyramid, warping, and cost volume", IEEE Conference on Computer Vision and Pattern Recognition, pp. 8934-8943 (June 2018).

[R45] Wang et al., "Image quality assessment: from error visibility to structural similarity", IEEE Transactions on Image Processing, vol. 13, no. 4, pp. 600-612, (13 Apr. 2004).

[R46] Weinzaepfel et al., "DeepFlow: Large displacement optical flow with deep matching", IEEE International Conference on Computer Vision, pp. 1385-1392 (2013).

[R47] Wu et al., "Video compression through image interpolation", European Conference on Computer Vision (ECCV), pp. 425-440 (2018).

[R48] Xu et al., "Motion detail preserving optical flow estimation", IEEE Transactions on Pattern Analysis and Machine Intelligence, vol. 34, no. 9, pp. 1744-1757, 13 Dec. 2011).

[R49] Xue et al., "Video enhancement with task-oriented flow", arXiv/1711.09078 (2017), Int'l J. of Computer Vision, vol. 127, no. 8, pp. 1106-25 (August 2019).

[R50] Zhang et al., "The unreasonable effectiveness of deep features as a perceptual metric", IEEE Conference on Computer Vision and Pattern Recognition, pp. 586-595 (June 2018).

[R51] Zhou et al., "View synthesis by appearance flow", European Conference on Computer Vision (BCCV), pp. 286-301 (2016).

[R52] Zhu et al., "Unpaired image-to-image translation using cycle-consistent adversarial networks", Int'l Conference on Computer Vision (ICCV), pp. 2223-2232 (2017).

The invention claimed is:

1. An apparatus configured to operate a frame interpolation neural network (FINN), the apparatus comprising:
optical flow estimation (OFE) circuitry configured to estimate a forward optical flow and a backward optical flow from a first input frame and a second input frame of a video;
feature pyramid extraction (FPE) circuitry configured to extract a first feature pyramid from the first input frame and a second feature pyramid from the second input frame;
warping circuitry configured to warp the first feature pyramid and the first input frame to a target temporal position between the first and second input frames using the forward optical flow, and warp the second feature pyramid and the second input frame to the target temporal position using the backward optical flow; and
frame synthesis neural network (FSN) circuitry configured to generate an interpolated output frame at the target temporal position guided by the warped first and second feature pyramids and the warped first and second input frames.

2. The apparatus of claim 1, wherein the FPE circuitry is further configured to apply a same configuration to the first and second input frames to extract the first and second feature pyramids, respectively.

3. The apparatus of claim 1, wherein:
the first feature pyramid includes a first set of features extracted from the first input frame at each resolution of a plurality of resolutions;
the second feature pyramid includes a second set of features extracted from the second input frame at each resolution of the plurality of resolutions; and
at least some features in the first set of features and at least some features in the second set of features are based on a color space of the first and second input frames.

4. The apparatus of claim 1, wherein the interpolated output frame includes pixels of the first and the second input frames shifted from the first and second input frames, respectively, to replicate motion to take place from the first input frame to the target temporal position and from the target temporal position to the second input frame.

5. The apparatus of claim 1, wherein the FPE circuitry is further configured to:
generate the first and second input frames at each of a plurality of resolutions based on features extracted from the first and second input frames.

6. The apparatus of claim 1, wherein, to extract the first and second feature pyramids, the FPE circuitry is further configured to:
read a number of input features from the first and second input frames at each resolution of a plurality of resolutions; and
produce a number of output features from the number of input features for each of the first and second input frames.

7. The apparatus of claim 6, wherein the FPE circuitry comprises:
convolutional circuitry interleaved with activation function circuitry and configured to convolve one or both of the first and second input frames at each resolution of a plurality of resolutions to extract a set of features from the first and second input frames at each resolution of the plurality of resolutions.

8. The apparatus of claim 3, wherein the FPE circuitry is further configured to:
use the interpolated output frame to extract new feature pyramids from respective input frames, the new feature pyramids including a set of features different than the features of the first and second feature pyramids.

9. The apparatus of claim 1, wherein the FSN circuitry comprises a grid of processing blocks, wherein each row in the grid of processing blocks corresponds to a resolution of a set of resolutions of the first and second feature pyramids.

10. The apparatus of claim 9, wherein a first processing block in each row is configured to receive a warped set of features at the corresponding resolution in the first and second feature pyramids.

11. The apparatus of claim 1, wherein the OFE circuitry, the FPE circuitry, the FSN circuitry, and the warping circuitry FW circuitry are coupled to one another via an interconnect technology, and implemented as:
respective dies of a System-in-Package (SiP) or Multi-Chip Package (MCP);
respective execution units or processor cores of a general purpose processor; or
respective digital signal processors (DSPs), field-programmable gate arrays (FPGAs), Application Specific Integrated Circuits (ASICs), programmable logic devices (PLDs), System-on-Chips (SoCs), Graphics Processing Units (GPUs), SiPs, MCPs, or any combination of DSPs, FPGAs, ASICs, PLDs, SoCs, GPUs, SiPs, and MCPs.

12. One or more non-transitory computer-readable media (NTCRM) comprising instructions of a frame interpolation neural network (FINN), wherein execution of the instructions by one or more processors is to cause the one or more processors to:
- obtain a first input frame and a second input frame of a video;
- estimate a forward optical flow and a backward optical flow from the first and second input frames, the forward optical flow indicating how pixels in the first input frame are to be changed to produce the second input frame during a time period starting from the first input frame and ending at the second input frame, and the backward optical flow indicating how pixels in the second input frame are to be changed to produce the first input frame during a time period starting from the first input frame and ending at the second input frame;
- extract a first feature pyramid from the first input frame and a second feature pyramid from the second input frame, the first feature pyramid including a first set of features extracted from the first input frame at each resolution of a plurality of resolutions, and the second feature pyramid including a second set of features extracted from the second input frame at each resolution of the plurality of resolutions;
- warp the first feature pyramid and the first input frame toward a target temporal position between the first and second input frames using the forward optical flow;
- warp the second feature pyramid and the second input frame toward the target temporal position using the backward optical flow; and
- generate an output frame at the target temporal position based on the warped first and second feature pyramids and the warped first and second input frames.

13. The one or more NTCRM of claim 12, wherein the first and second sets of features are based on a color space of the first and second input frames, respectively.

14. The one or more NTCRM of claim 12, wherein execution of the instructions is to further cause the one or more processors to:
- read a number of input features from the first and second input frames at each resolution; and
- generate a number of output features from the number of input features at each resolution, wherein the output features at each resolution represent different octaves of the input features and vary in number.

15. The one or more NTCRM of claim 14, wherein the FINN comprises a plurality of convolutional functions interleaved with a plurality of activation functions, and execution of the instructions is to cause the one or more processors to:
- operate the convolutional functions to convolve the first and second input frames at each resolution; and
- operate the activation functions to extract individual features from the convolved first and second input frames.

16. The one or more NTCRM of claim 12, wherein the FINN includes a frame synthesis neural network comprising a grid of processing blocks, wherein each row in the grid of processing blocks corresponds to a resolution of the plurality of resolutions, and execution of the instructions is to cause the one or more processors to:
- concatenate the warped first and second feature pyramids such the concatenated feature pyramid includes features extracted from the first and second input frames at each resolution; and
- input the features extracted from the first and second input frames at each resolution to respective input processing blocks of each row.

17. A computing system, comprising:
- processor circuitry coupled with memory circuitry, the memory circuitry arranged to store program code of a frame interpolation neural network (FINN), the FINN comprising an optical flow estimator (OFE), a feature pyramid extractor (FPE), a forward warping engine (FWE), and a frame synthesis neural network (FSN);
- the processor circuitry is arranged to operate the OFE to estimate a forward optical flow and a backward optical flow from first and second input frames of a video to be interpolated, the forward optical flow indicating how pixels in the first input frame are to be changed to produce the second input frame during a time period starting from the first input frame and ending at the second input frame, and the backward optical flow indicating how pixels in the second input frame are to be changed to produce the first input frame during a time period starting from the first input frame and ending at the second input frame;
- the processor circuitry is arranged to operate the FPE to extract a first feature pyramid from the first input frame and a second feature pyramid from the second input frame, the first feature pyramid including a first set of features extracted from the first input frame at each resolution of a plurality of resolutions, and the second feature pyramid including a second set of features extracted from the second input frame at each resolution of the plurality of resolutions;
- the processor circuitry is arranged to operate the FWE to warp the first feature pyramid to a target temporal location using the forward optical flow, and warp the second feature pyramid to the target temporal location using the backward optical flow; and
- the processor circuitry is arranged to operate the FSN to generate an output frame at a desired temporal position between the first and second input frames based on the warped first and second feature pyramids, wherein the output frame includes pixels of the first and the second input frames shifted from the first and second input frames, respectively, to replicate motion to take place from the first input frame to the target temporal location and from the target temporal location to the second input frame.

18. The computing system of claim 17, wherein, to generate the output frame, the processor circuitry is further arranged to warp the first and second input frames toward the target temporal location and to operate the FSN to:
- predict an interpolation result from the warped feature pyramids and the warped first and second input frames.

19. The computing system of claim 18, wherein the FSN comprises a grid of processing blocks, wherein each row in the grid of processing blocks corresponds to a resolution of the set of resolutions.

20. The apparatus of claim 1, wherein:
- the forward optical flow indicates how pixels in the first input frame are to be changed to produce the second input frame during a time period starting from the first input frame and ending at the second input frame;
- the backward optical flow indicates how pixels in the second input frame are to be changed to produce the first input frame during a time period starting from the first input frame and ending at the second input frame.

21. The apparatus of claim 1, wherein the FPE circuitry network and the FSN circuitry are jointly trained.

22. The apparatus of claim 1, wherein:
the target temporal position is represented by t∈(0, 1);
the first feature pyramid is warped according to the forward optical flow scaled by t; and
the second feature pyramid is warped according to the backward flow scaled by 1-t.

23. The apparatus of claim 1, wherein the warping of the first and second feature pyramids comprises warping of individual levels of the first and second feature pyramids, respectively.

24. The apparatus of claim 1, wherein the FSN circuitry is to incorporate a photo consistency quality measure of the forward optical flow to combine information from the warped first and second feature pyramids.

25. The one or more NTCRM of claim 12, wherein the warping of the first and second feature pyramids comprises warping of individual levels of the first and second feature pyramids, respectively.

\* \* \* \* \*